United States Patent
Burke et al.

(10) Patent No.: US 10,445,923 B2
(45) Date of Patent: Oct. 15, 2019

(54) LEVERAGING CONTROL SURFACE FAST CLEARS TO OPTIMIZE 3D OPERATIONS

(71) Applicant: Intel Corporation, Santa Clara, CA (US)

(72) Inventors: Devan Burke, Portland, OR (US); Abhishek Venkatesh, Hillsboro, OR (US); Travis Schluessler, Berthoud, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,381

(22) Filed: Sep. 28, 2017

(65) Prior Publication Data

US 2019/0096117 A1    Mar. 28, 2019

(51) Int. Cl.
*G06T 15/04* (2011.01)
*G06T 15/00* (2011.01)
*G06T 15/80* (2011.01)

(52) U.S. Cl.
CPC ............ *G06T 15/04* (2013.01); *G06T 15/005* (2013.01); *G06T 15/80* (2013.01)

(58) Field of Classification Search
None
See application file for complete search history.

(56) References Cited

U.S. PATENT DOCUMENTS

| 6,535,218 B1* | 3/2003 | Schlapp | G06T 1/60 345/545 |
|---|---|---|---|
| 2008/0316214 A1* | 12/2008 | Peeper | G06T 15/005 345/501 |
| 2014/0176541 A1* | 6/2014 | Surti | G06T 15/503 345/420 |
| 2015/0302545 A1* | 10/2015 | Harris | G06T 1/20 345/501 |
| 2016/0071246 A1* | 3/2016 | Uralsky | G06T 11/40 345/611 |

\* cited by examiner

*Primary Examiner* — YuJang Tswei
(74) *Attorney, Agent, or Firm* — Jaffery Watson Mendonsa & Hamilton LLP

(57) ABSTRACT

One embodiment provides a graphics processor comprising a hardware graphics rendering pipeline configured to perform multisample anti-aliasing, the hardware graphics rendering pipeline including pixel processing logic to determine that each sample location of a pixel of a multisample surface is associated with a clear value and resolve a color value for the pixel to a non-multisample surface via a write of metadata to indicate that the pixel has the clear value.

18 Claims, 29 Drawing Sheets

FIG. 9A  GRAPHICS PROCESSOR COMMAND FORMAT
900
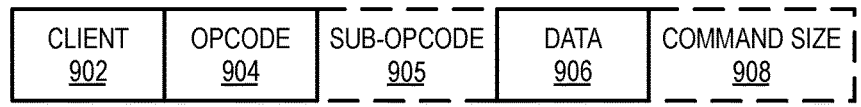
FIG. 9B  GRAPHICS PROCESSOR COMMAND SEQUENCE
910
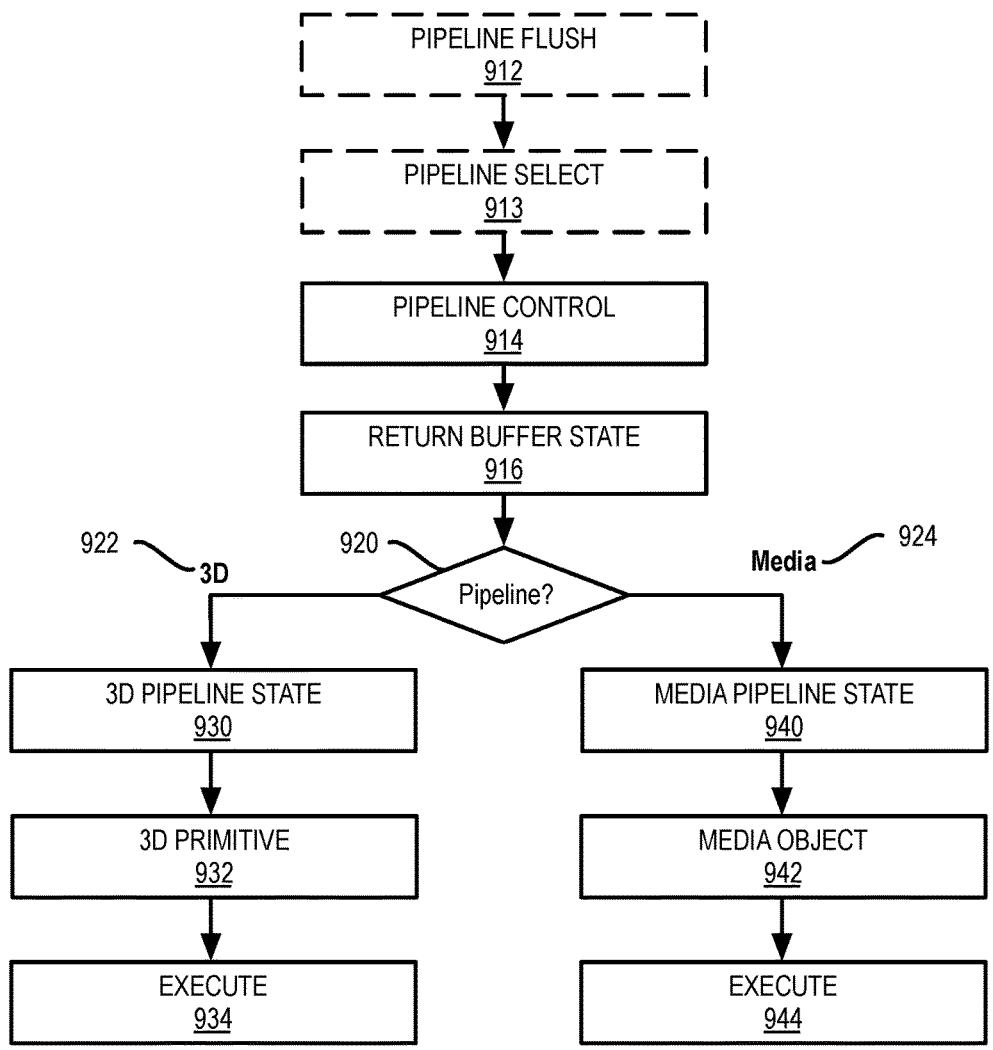

LEVERAGING CONTROL SURFACE FAST CLEARS TO OPTIMIZE 3D OPERATIONS

FIELD OF INVENTION

This invention relates generally to data processing and more particularly to graphics data processing via a graphics processing unit.

BACKGROUND OF THE DESCRIPTION

3D APIs includes common operations to resolve a multisample anti-aliased (MSAA) texture, copy resource, initialize a texture and generate mipmaps and perform other operations. In all such operations, graphics driver logic in control of a graphics processor can program a pixel shader to sample from source texture and write to a destination as render target. For texture initialization, the source is simply written to destination. For MSAA resolve and mipmap generation the graphics processor can output a simple average of the samples color into the non-MSAA destination or the next mip level. This approach enables color compression when writing to destination render target but does not utilize any cleared status that may be set for the source texture.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIG. 9A-9B illustrate a graphics processor command format and command sequence, according to some embodiments;

DETAILED DESCRIPTION

Figure 1:
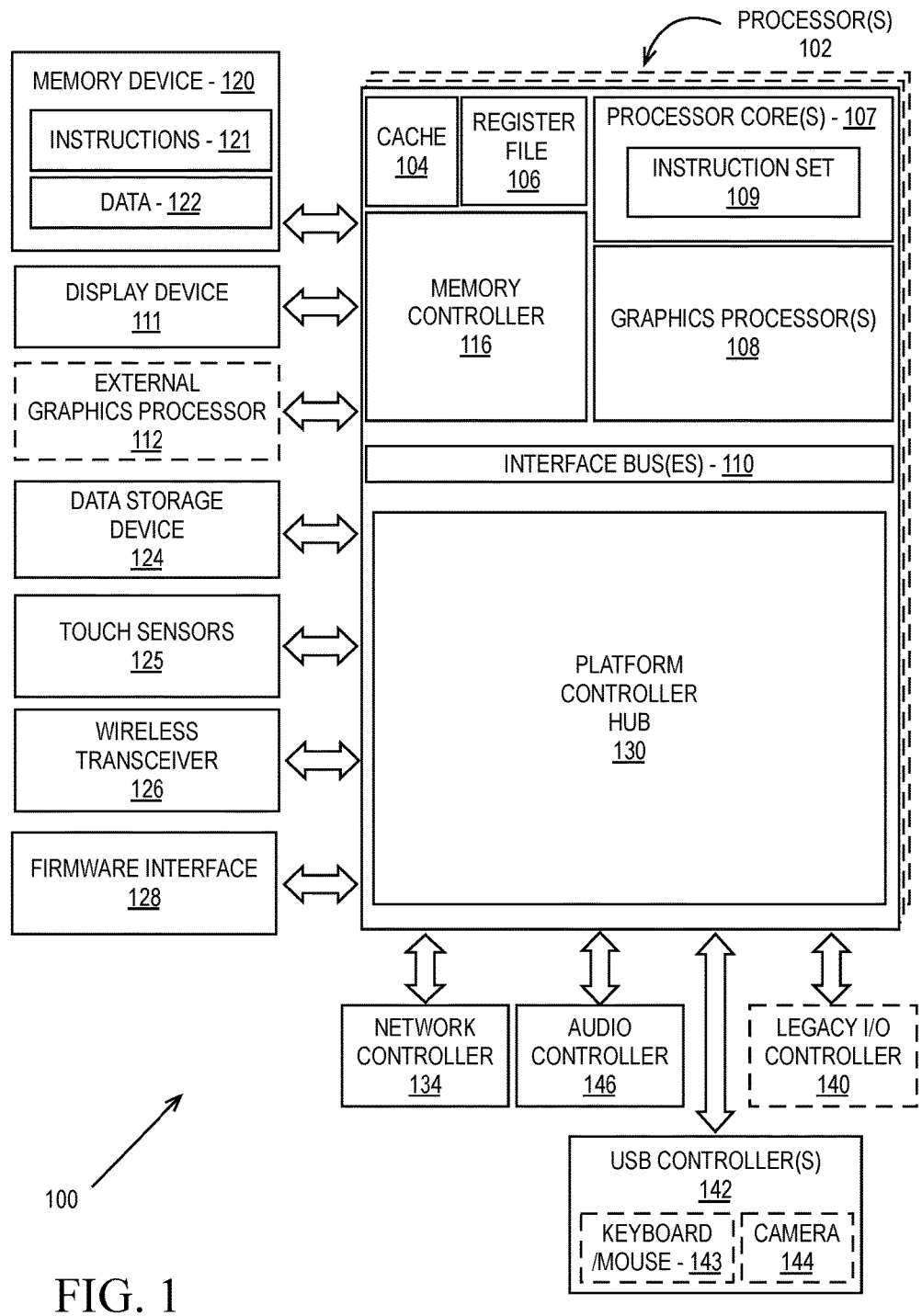
FIG. 1 is a block diagram of a processing system, according to an embodiment.

Embodiments described herein enable certain rendering operations to be performed using reduced memory bandwidth, improving performance for common 3D operations such as MSAA resolve, static texture initialization, surface copies, and other operations performed by 3D games and benchmarks. A graphics processing unit configured to implement the described techniques can realize improved overall performance on gaming and benchmark applications, particularly when multi-sample anti-aliasing is enabled. In addition to improved performance, reduced power operation can also be realized why applying the techniques described herein.

In one embodiment, a graphics processor can enhance compression of render target data via the use of hardware supported fast clears and a control surface for a render target. A control surface enables compression of a render target, or graphics rendering surface, by storing metadata about the surface, such as the location of samples for MSAA or an indication that all entries in a cache line are the same color. The techniques described herein enable 3D commands to consume fewer resources and consume reduced memory bandwidth during operation, improving the overall performance of the graphics processor and the host system of the graphics processor.

In various embodiments, the graphics processor is configured to preserve the state of a fast clear control surface associated with a source surface, to a destination surface and apply the preserved state to a control surface associated with the destination. In one embodiment, such techniques can be configured by graphics driver control software and implemented by shader processing logic within the graphics processor. In one embodiment, an MSAA resolve is implemented using a shader kernel that is configured such that whenever a pixel is cleared in the source MSAA surface, the pixel will remain cleared in the resolved non-MSAA destination surface. In one embodiment, for texture initialization and mipmap generation the processing logic is configurable to recognize that background color is likely a constant clear color. While identifying the clear color incurs some cost, the operation to determine the clear color likely occurs once and outside of the main render loop of a 3D application. Similar to the MSAA resolve scenario, the shader kernel used to write to destination surface is configured such that any cachelines that are set to the clear color will remain cleared in the destination surface.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

In general, a graphics rendering process can generate an image or images from model data using a wide range of computer implemented techniques. In some graphics rendering implementations an image may be rendered using rasterization by sampling different functions such as, for example, a visibility function and/or a shading function. In general, the samples for a visibility function may be termed visibility samples and the samples for a shading function may be termed shading samples. When implementing techniques such as multi-sampling anti-aliasing (MSAA), multiple visibility samples may be used per. Rendering to a multisample render target that stores multiple samples per pixels is more bandwidth intensive than using a simple sample. To restrain bandwidth consumption, various forms of compression can be used. When lossless color compression techniques are implemented for a multisample render target, storing the samples in an interleaved manner can increase the efficiency of such techniques in comparison to planar techniques of storing sample data.

In the description that follows, FIGS. 1-14 provide an overview of exemplary data processing system and graphics processor logic that incorporates or relates to the various embodiments. FIGS. 15-24 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data. The embodiments described herein may be practiced without one or more of the specific details provided herein. In some instances, well-known features have not been described to avoid obscuring the details of the present embodiments.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
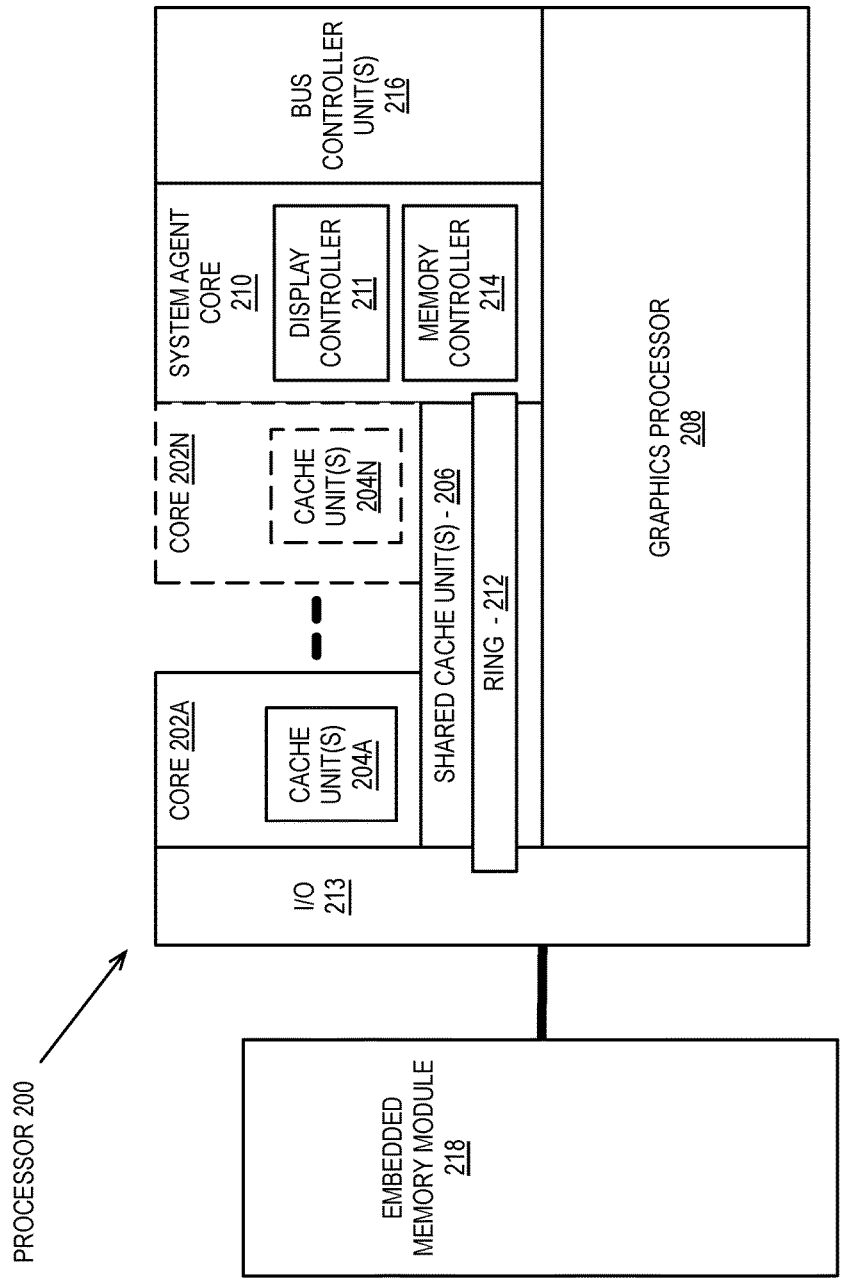
FIG. 2 is a block diagram of a processor according to an embodiment.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
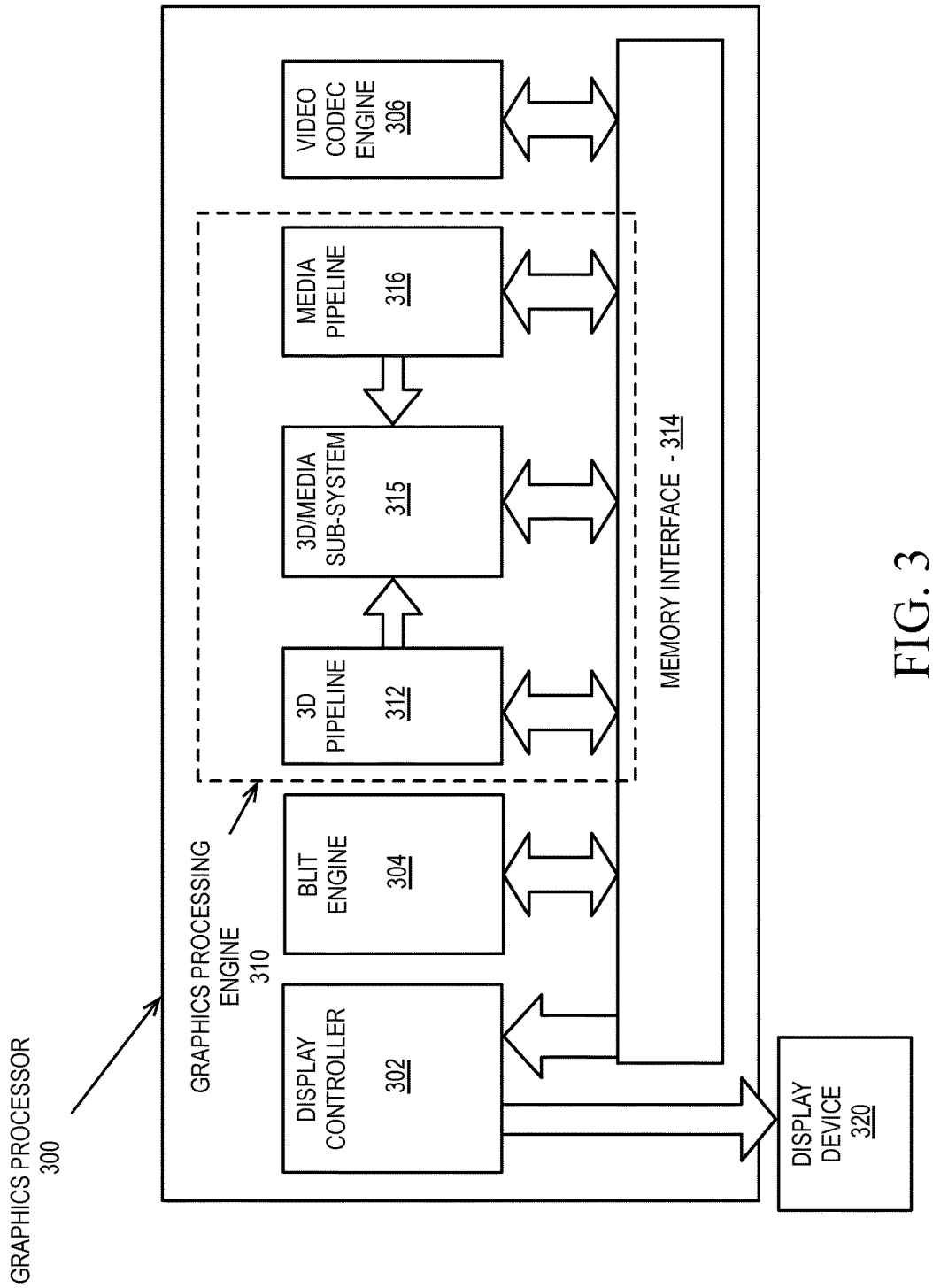
FIG. 3 is a block diagram of a graphics processor, according to an embodiment.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
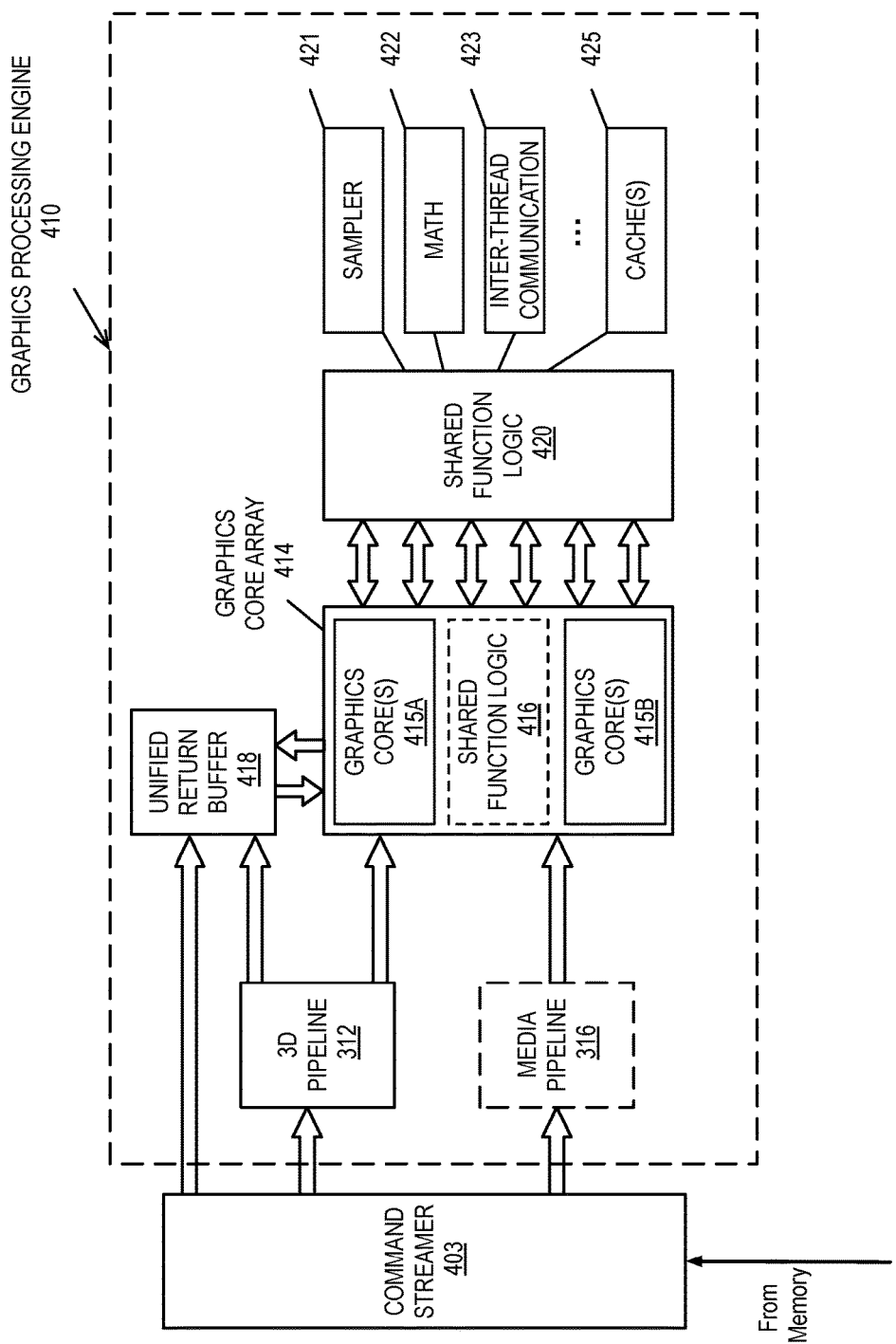
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
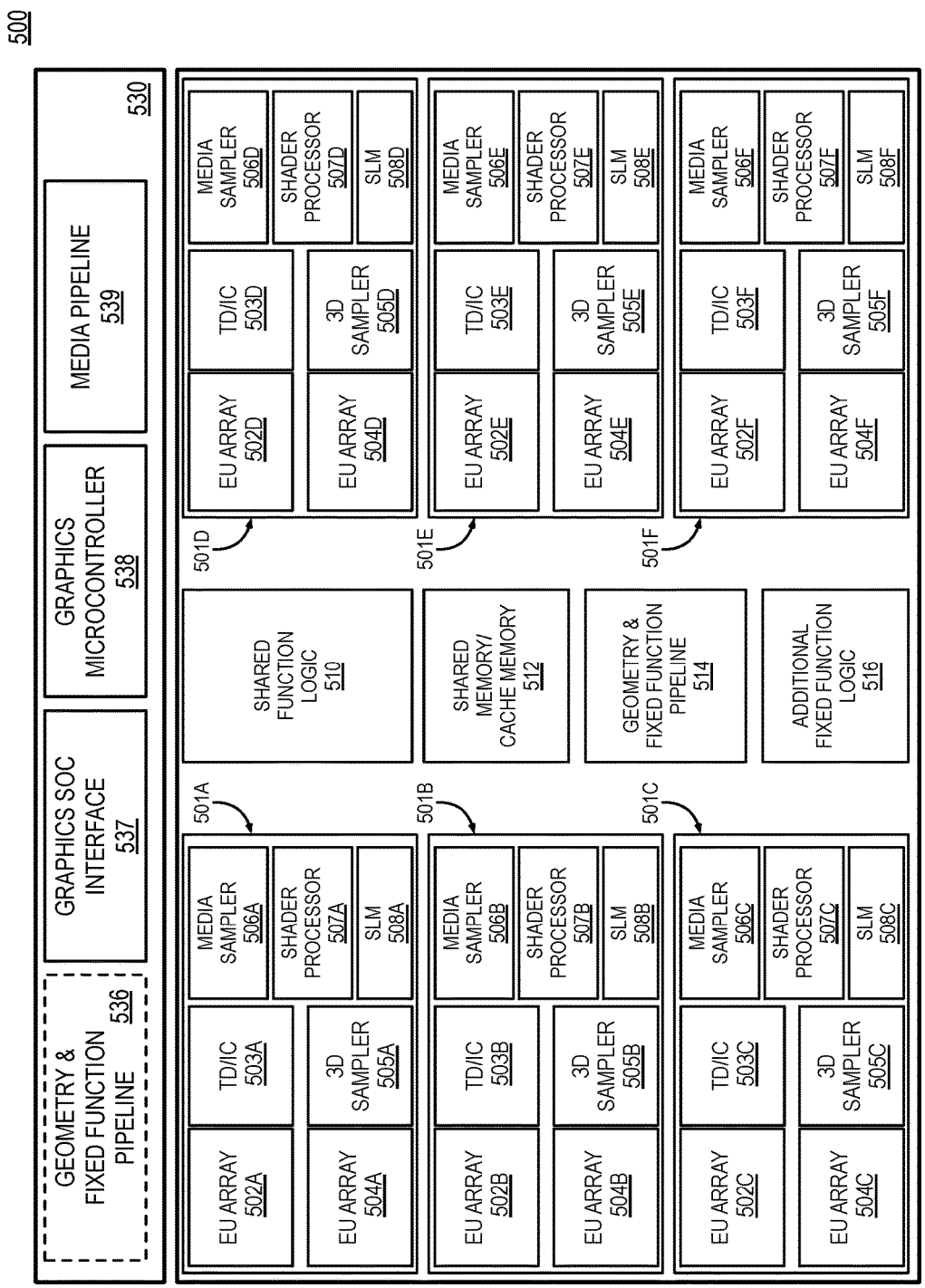
FIG. 5 is a block diagram of hardware logic of a graphics processor core, according to some embodiments described herein.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
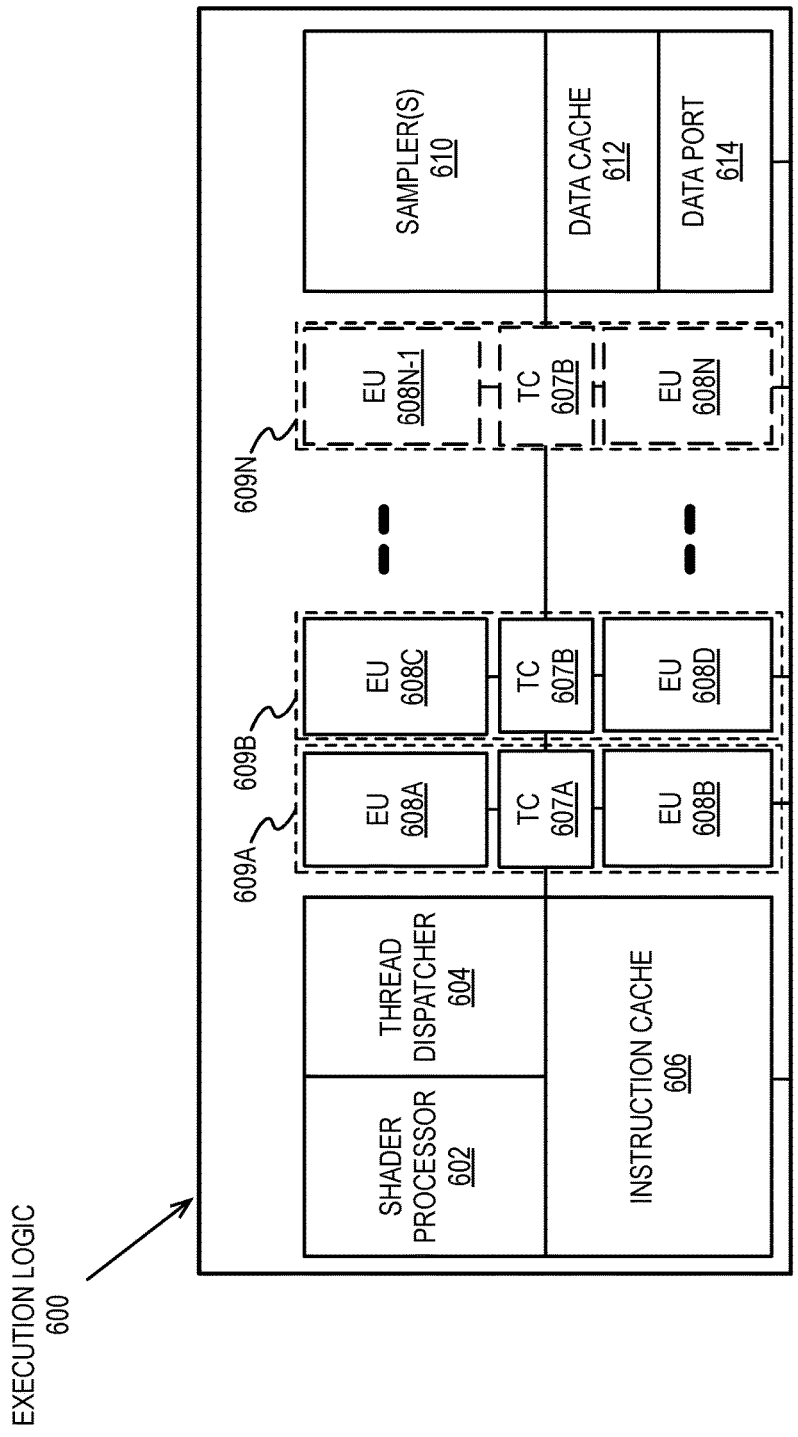
FIGS. 6A-6B illustrate thread execution logic including an array of processing elements employed in a graphics processor core according to embodiments described herein.
Figure 6B:
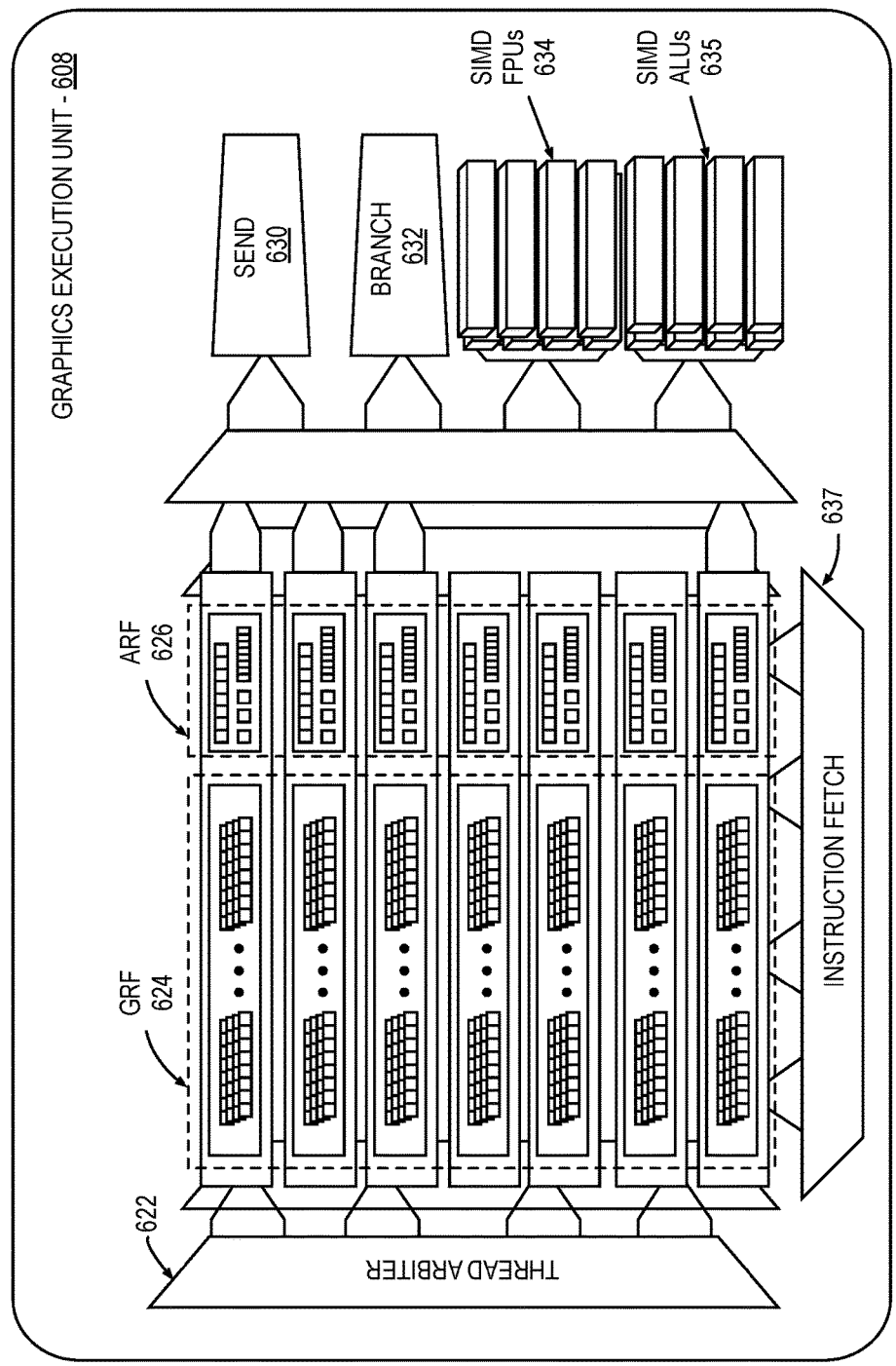

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

Figure 7:
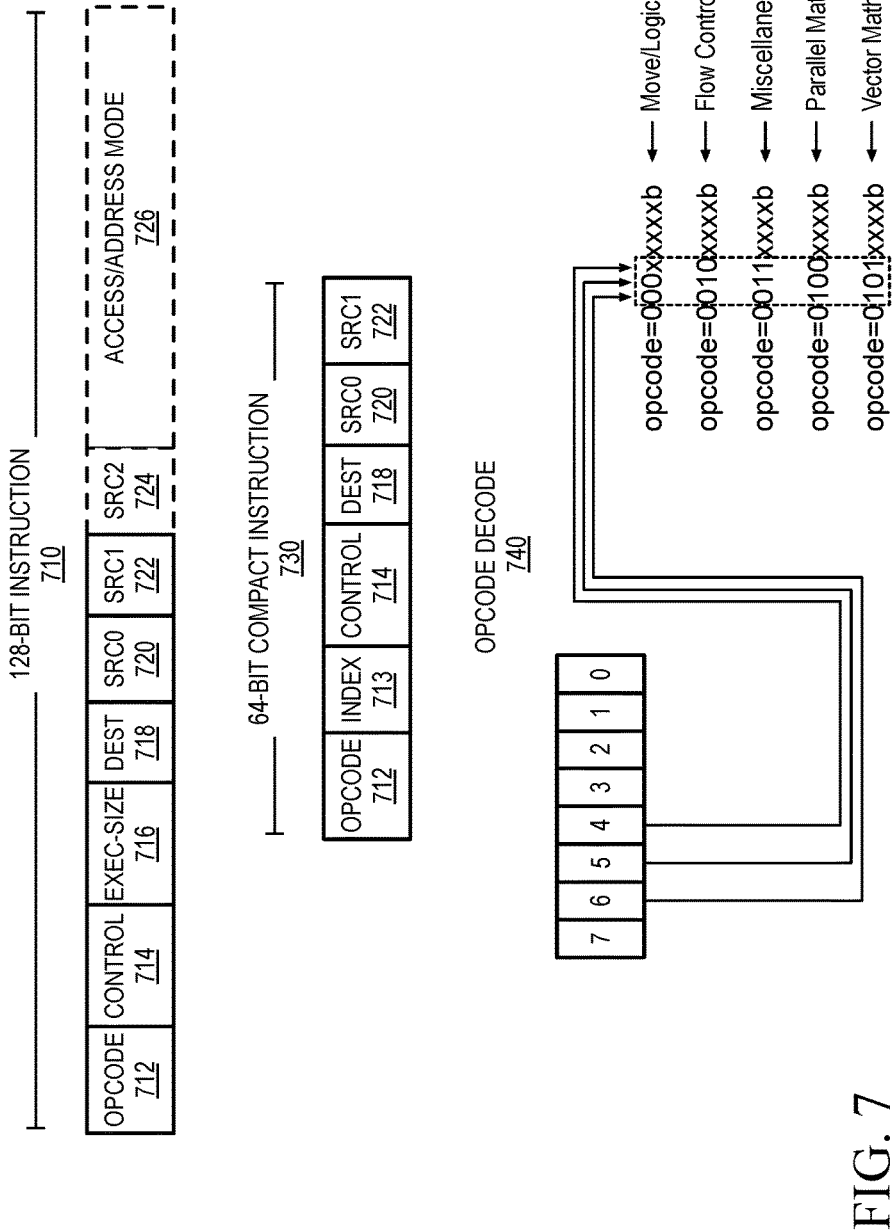
FIG. 7 is a block diagram illustrating a graphics processor instruction formats according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
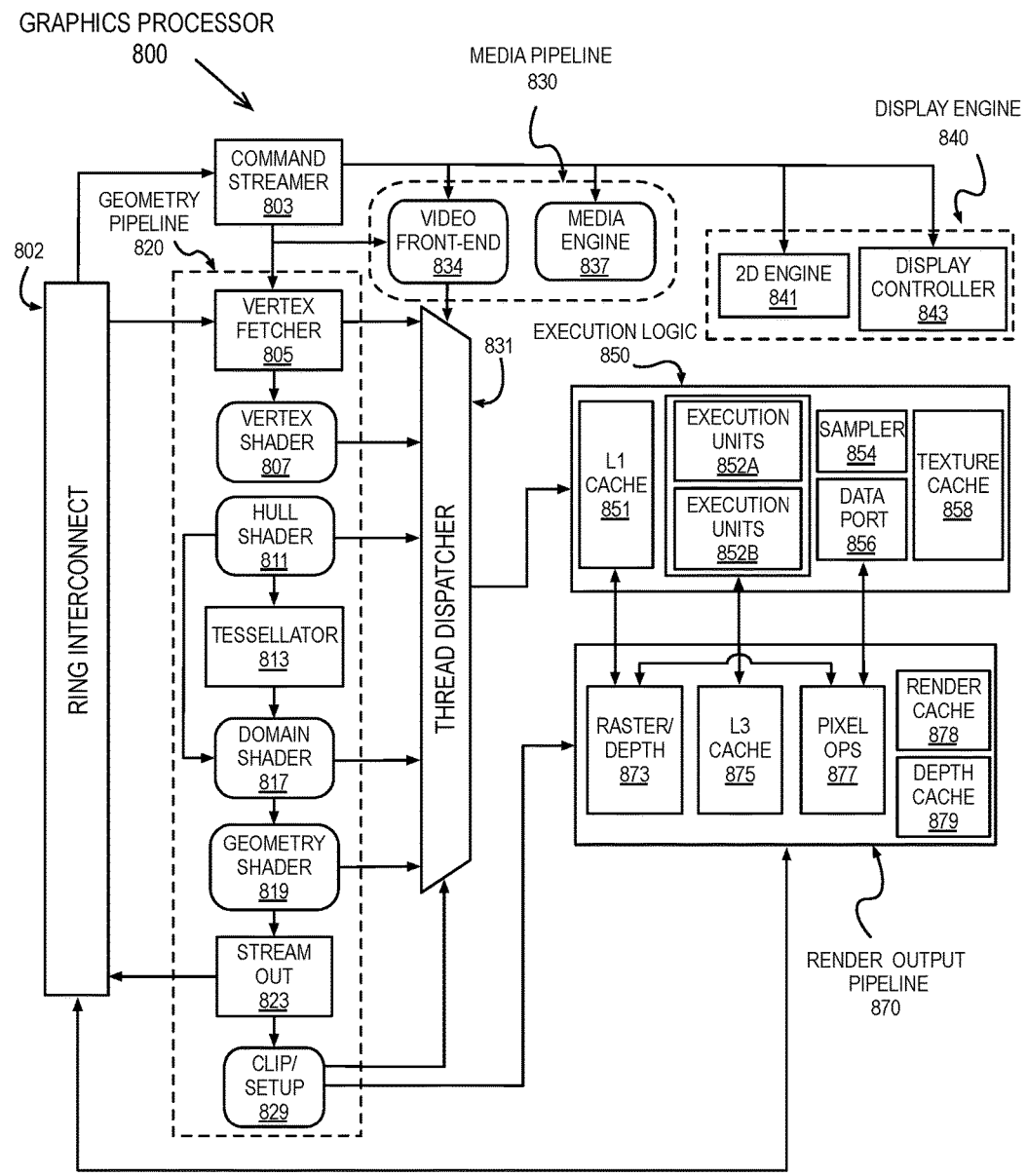
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
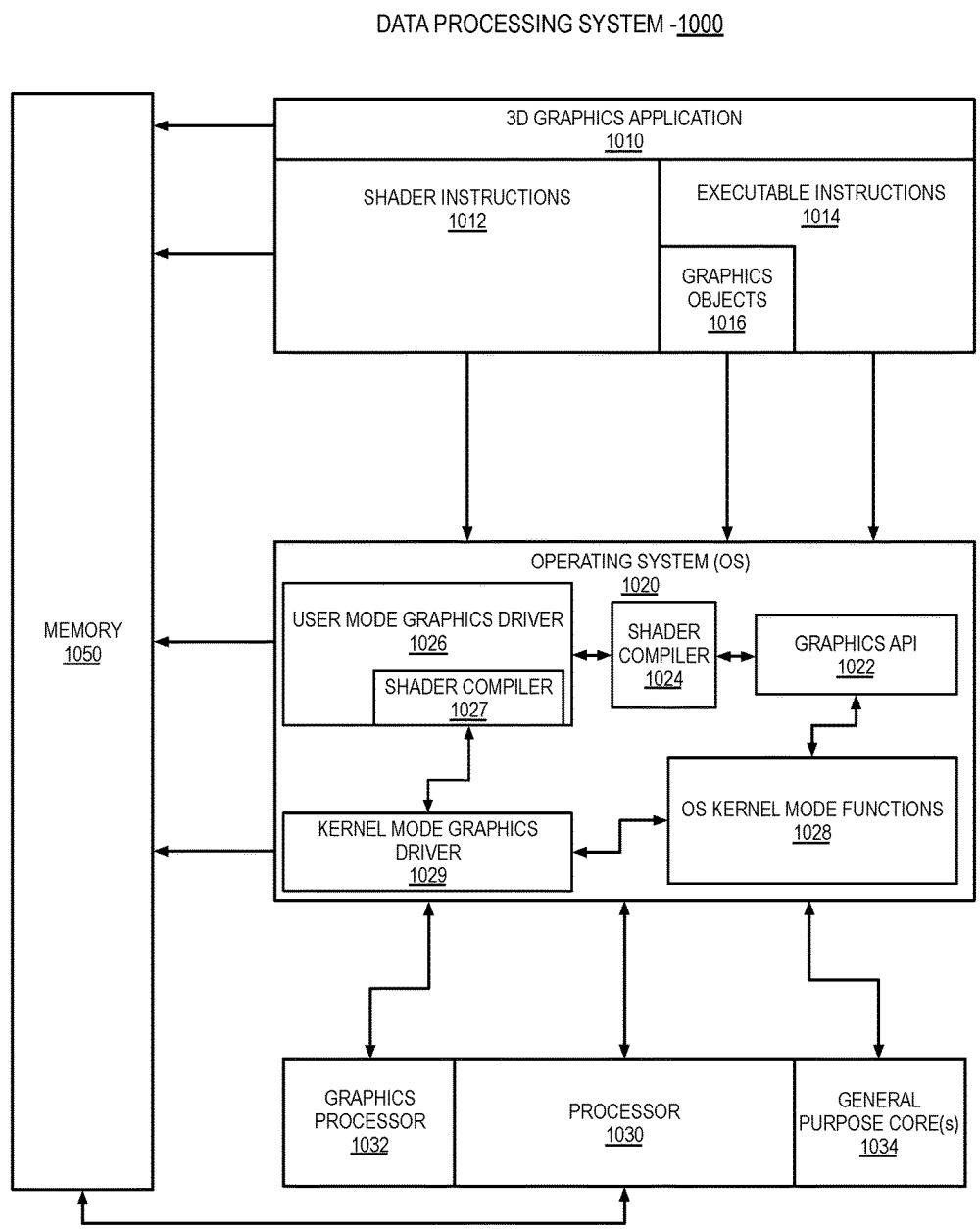
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
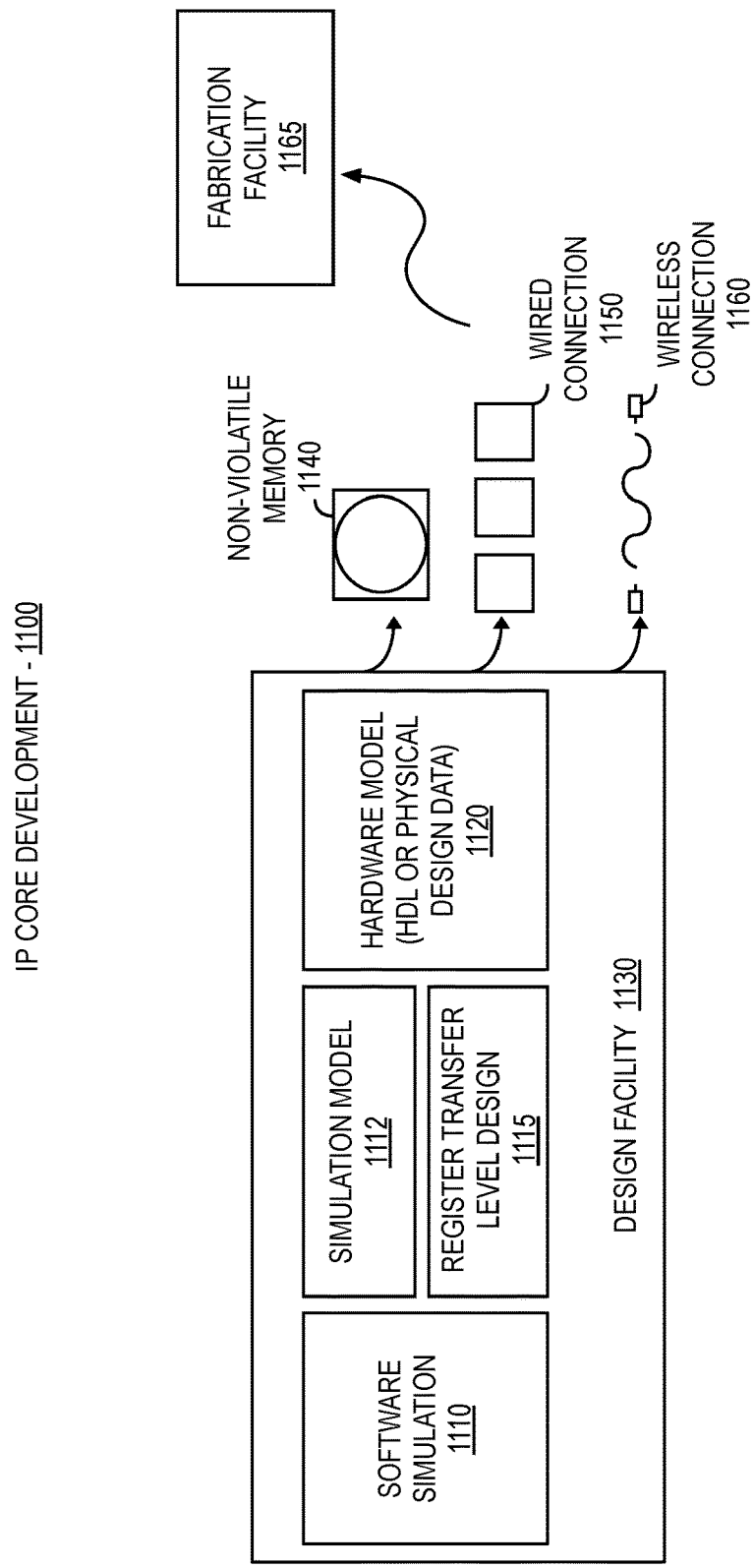
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
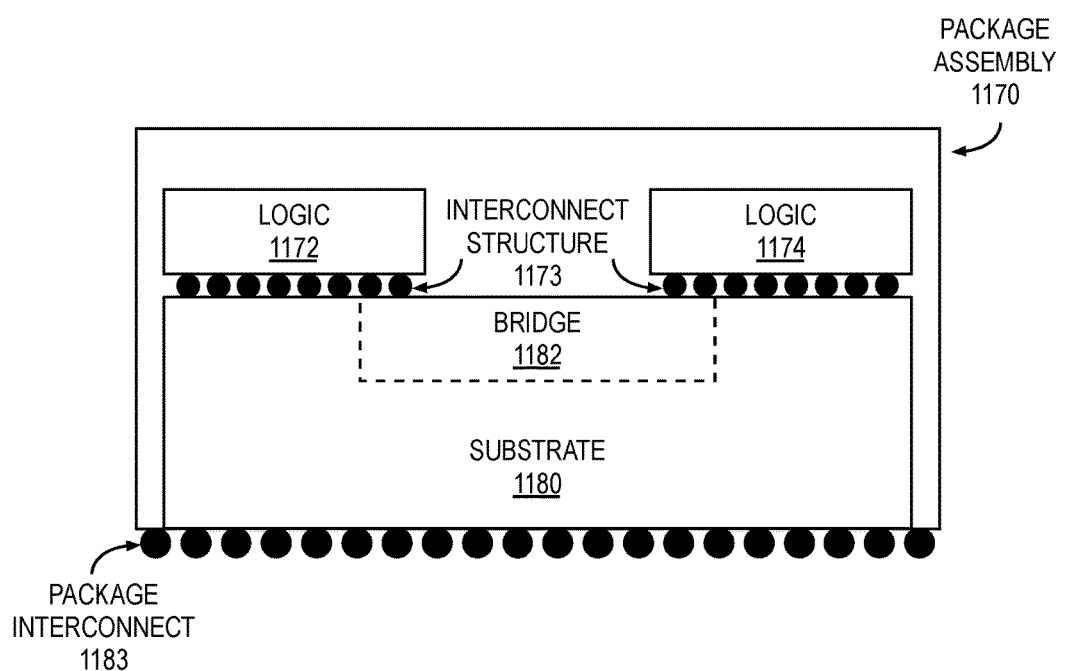
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
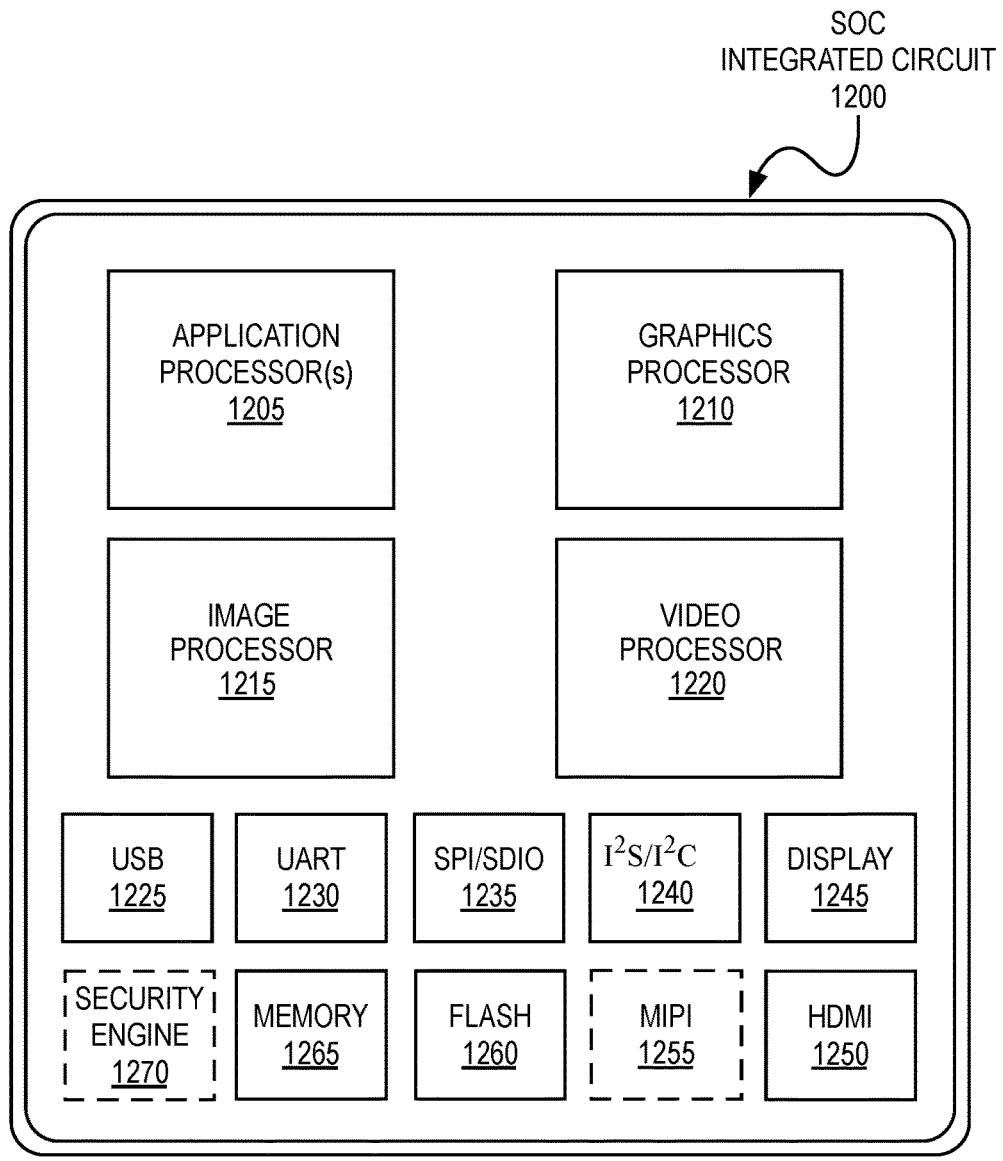
FIG. 12 is a block diagram illustrating an exemplary system on a chip integrated circuit, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
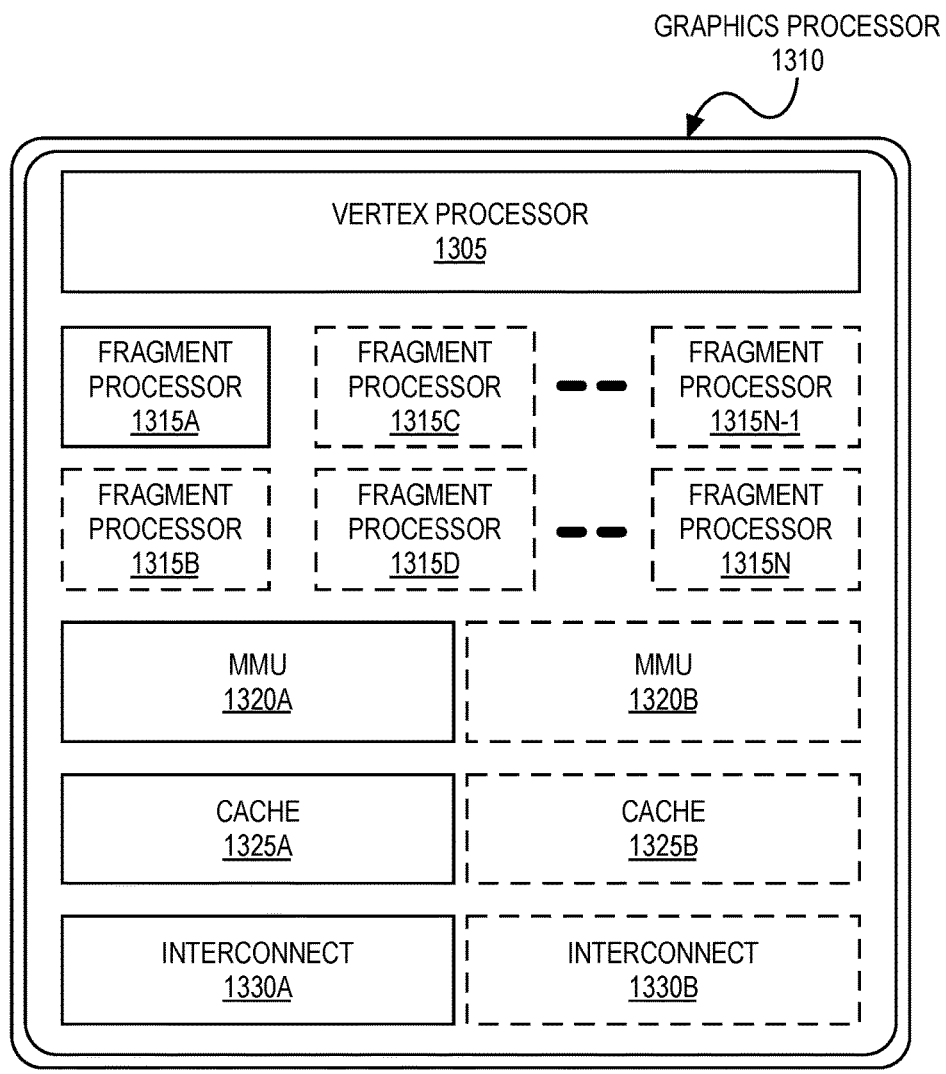
FIGS. 13A-13B are block diagrams illustrating exemplary graphics processors for use within an SoC, according to embodiments described herein.
Figure 13B:
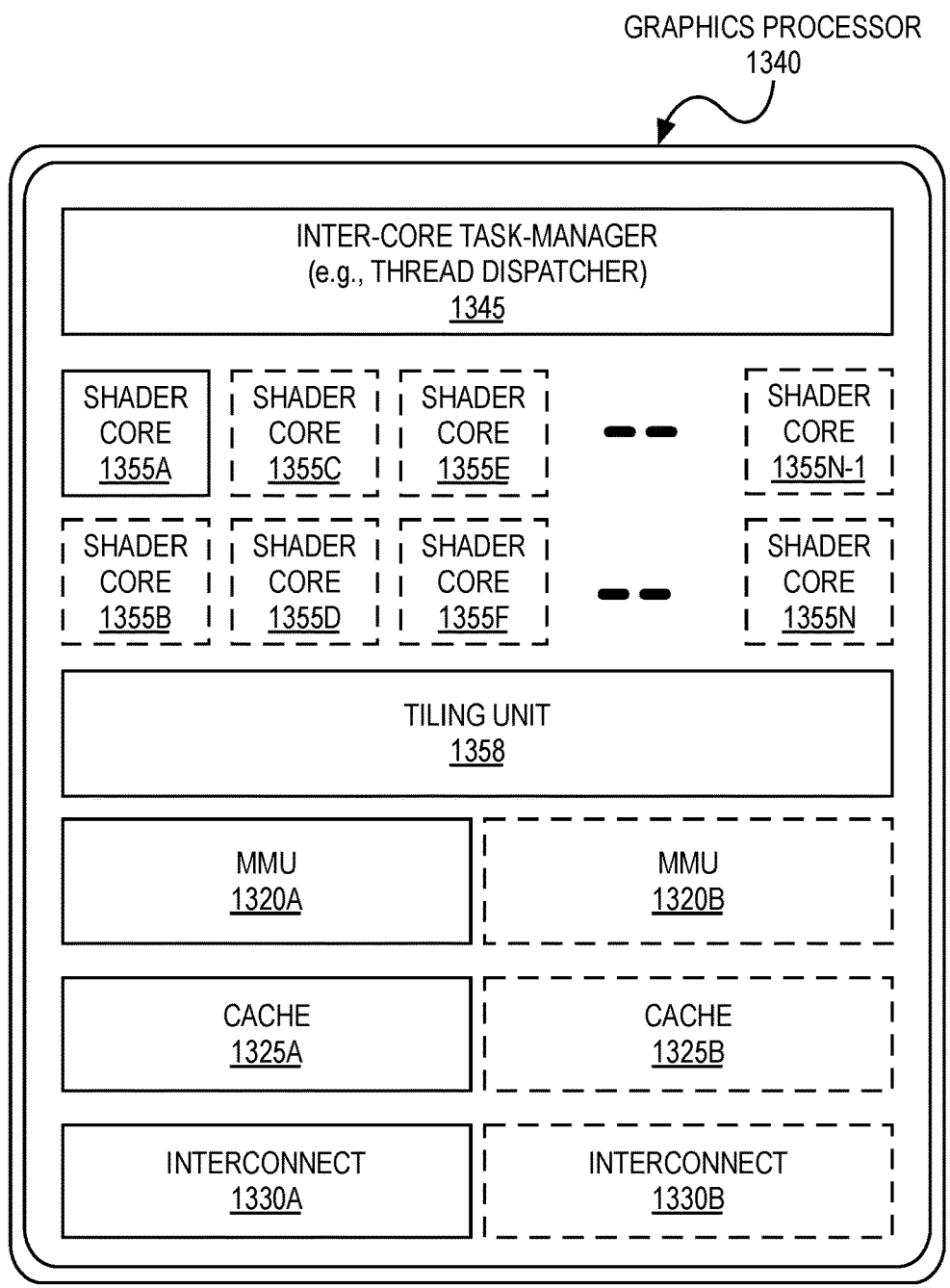

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
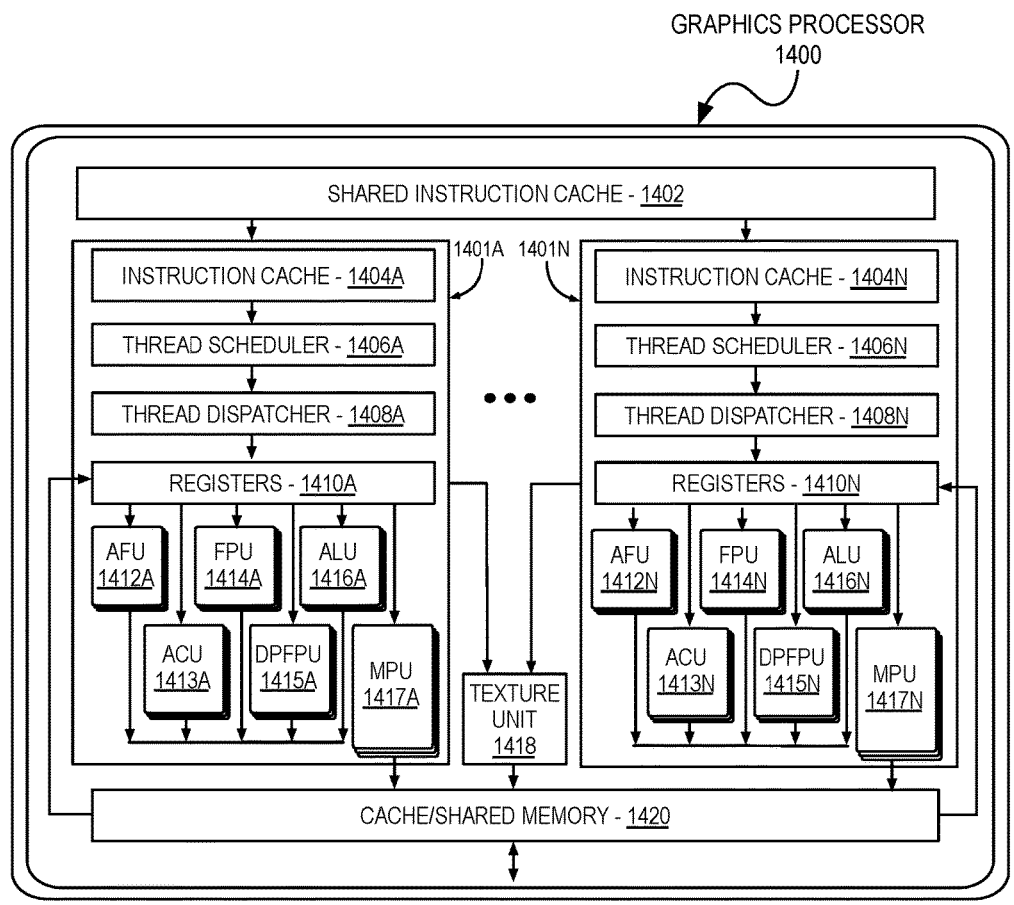
FIGS. 14A-14B illustrate additional exemplary graphics processor logic according to embodiments described herein.
Figure 14B:
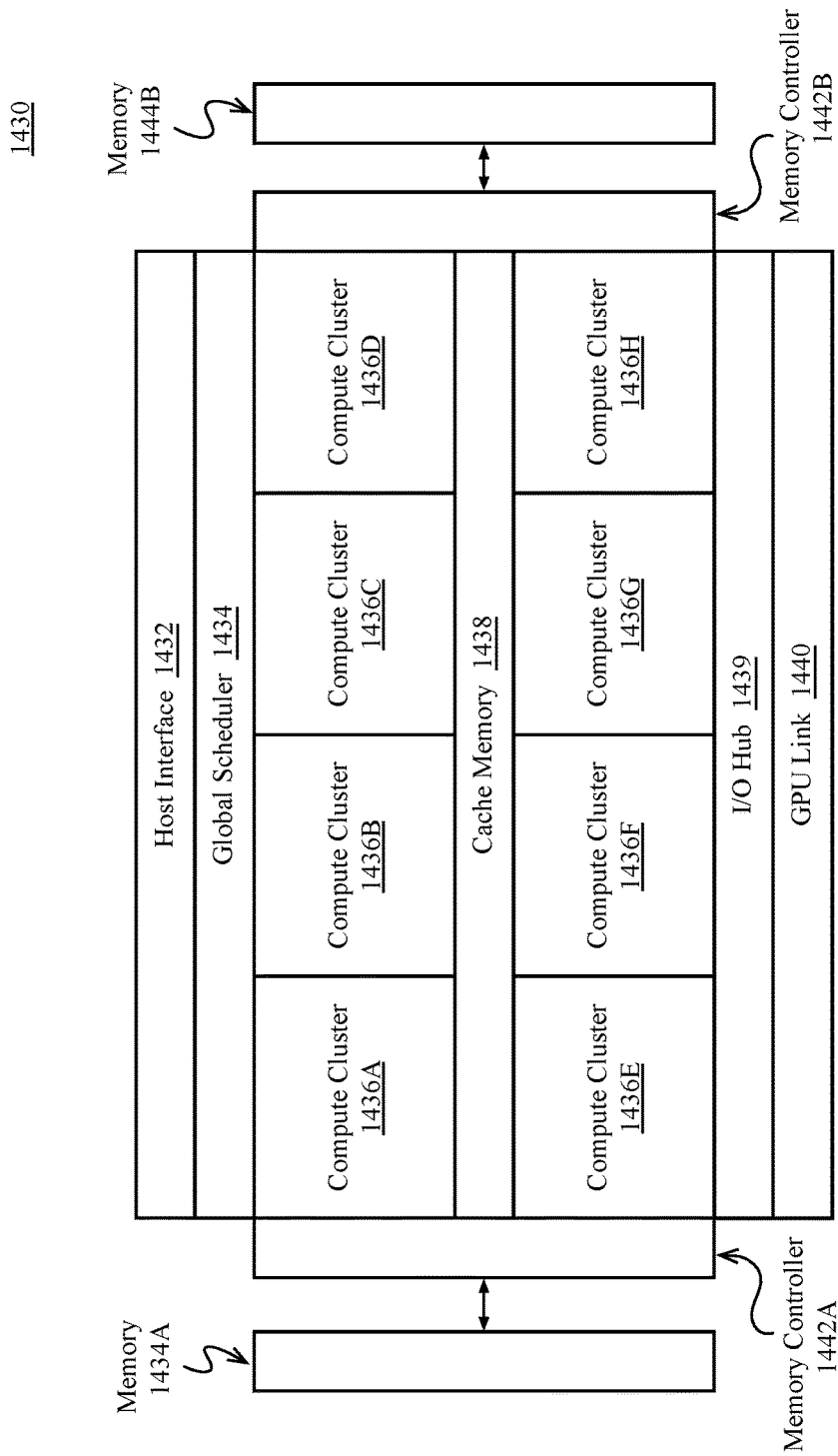

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Fast Clears Using Clear Metadata

In most common rendering scenarios, an application will perform a clear operation on a framebuffer before rendering to the framebuffer. In one implementation, the clear operation is optimized using a set of control bits. Instead of clearing the framebuffer, cache lines representing the framebuffer are marked as "CLEAR." This represents a significant optimization because one or two control bits can represent multiple cache lines. When areas of the framebuffer are rendered, the control bits can be marked as "DATA," "COMPRESSED," or other states that indicate that the framebuffer includes data that data is to be read from the frame buffer.

Graphics hardware having end-to-end clear color optimizations can suppresses clear writes having the same color as the clear color, as well as optimizing the sampler and display hardware to take advantage of the clear color. When cache lines with "CLEAR" control bits are to be fetched for other operations, instead of fetching the clear color by reading the framebuffer memory, the data in the framebuffer is substituted with the clear color value in a register. Additionally, if lines of a framebuffer are rendered using a color that matches the clear color, the state of the control bits for that region of the framebuffer can be marked as CLEAR. When the lines are marked as CLEAR instead of DATA, the graphics processor is not required to write out CLEAR cache lines of the framebuffer. Instead, the graphics processor unit (GPU) updates control bits in a control surface associated with the relevant lines of the framebuffer.

Figure 15:
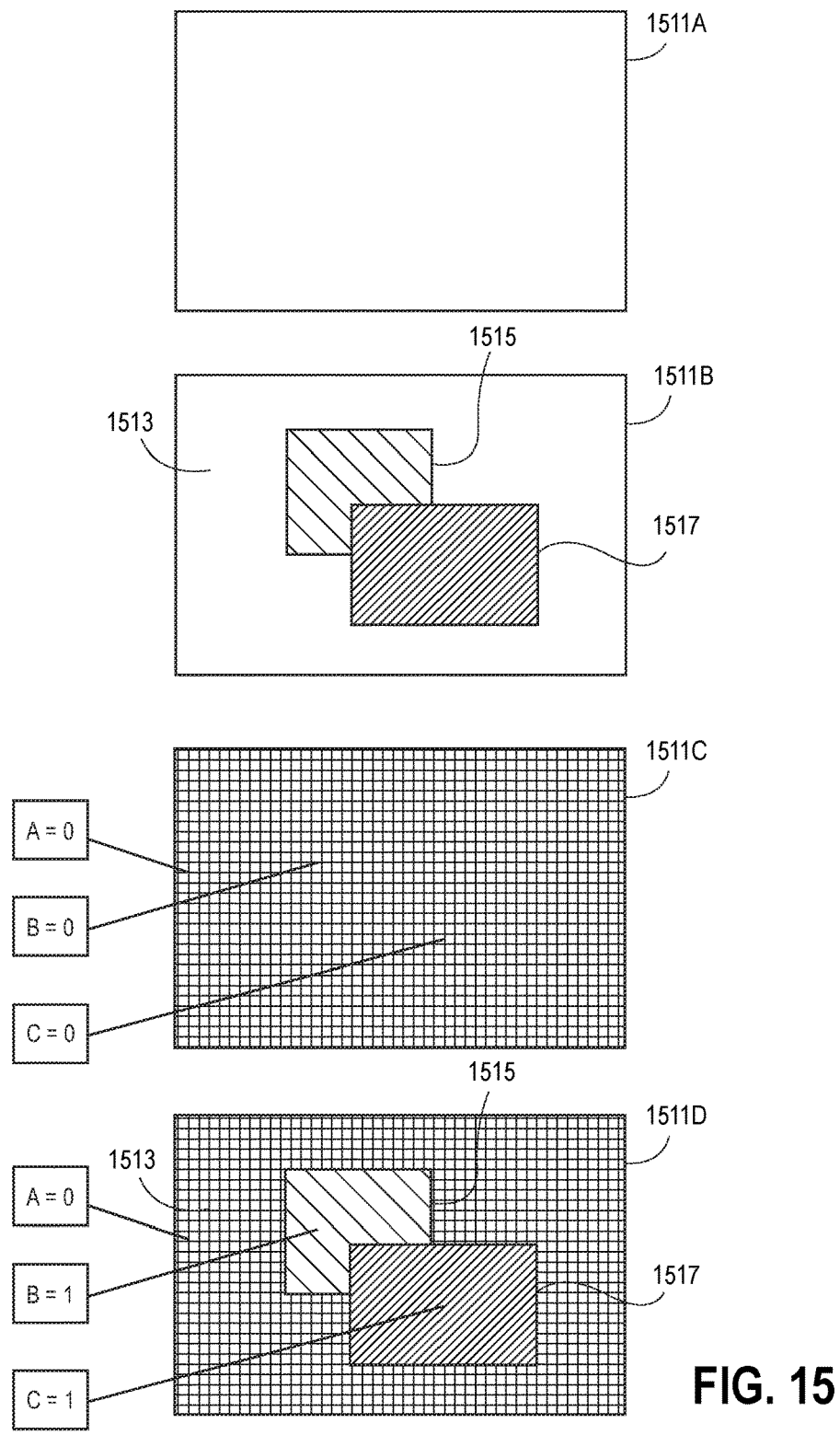
FIG. 15 illustrates an application rendering sequence for optimizing color buffer clear performance.

FIG. 15 illustrates an application rendering sequence for optimizing color buffer clear performance. The illustrated sequence begins with framebuffer 1511A of a frame being cleared with a color (e.g., green, blue, red, black, white, etc.). As illustrated, after this initial clearing operation, framebuffer 1511A may be regarded as a clear framebuffer with a single color occupying all its portions. The number of pixels or memory written for the clear is the full framebuffer.

Subsequently, as illustrated, any amount and type of data may be rendered to occupy corresponding regions 1515, 1517 of framebuffer 1511B. For example, multiple graphics images can occupy regions 1515, 1517 and the corresponding memory buffers of framebuffer 1511B. It is further illustrated that upon having occupied regions 1515, 1517 of framebuffer 1511B, the remaining region 1513 of framebuffer 1511B and its associate memory buffers remain clear as it was previously the case with reference to framebuffer 1511A. However, it is to be noted that even though regions 1515 and 1517 were over-written with other content and hence there was no need to clear them, they were cleared when the full framebuffer was cleared in 1511A.

The wasted clear operations can be optimized in some embodiments. In one such embodiment, clear operations are optimized by tracking the state of the framebuffer instead of performing an actual clear. The states of framebuffer 1511A and 1511B are further illustrated with reference to framebuffer 1511C and 1511D, respectively. Framebuffer 1511C is illustrated as a hash square, where each little hash square may be referred to by secondary control bits. Each hash square represents a block of memory in the framebuffer and in one embodiment could represent a cache line or multiple cache lines in another embodiment.

In one implementation, three control bits (e.g., labeled and referenced as A, B, and C) are illustrated as corresponding to regions 1513, 1515, and 1517. When the framebuffer is cleared, instead of clearing the framebuffer, the control bits are set to cleared state. Here, the three control bits, such as A, B, and C, are shown in the cleared (e.g., CLEAR) state corresponding to and reflecting the state of framebuffer 1511A. In one embodiment, value 0 represents CLEAR and accordingly, A=0, B=0, and C=0. The data in the actual framebuffer may be invalid, as the clear operation has been skipped.

Framebuffer 1511D is shown in a rendered state which corresponds to framebuffer 1511B and accordingly, regions 1515 and 1517 are shown as being rendered and occupied and their corresponding control bits, such as B and C, are shown as having a value of 1. In one embodiment, value 1 represents a DATA state, which indicates that valid data has been written to the cache lines. Accordingly, control bit B=1 and control bit C=1, while control bit A continues to have a value of 0, which represents a CLEAR state. A is indicated as CLEAR because A has not been written after the clear operation was performed in 1511C. Stated differently, while control bits B and C represent the rendered parts, such as 1515 and 1517, representing valid data, while control bit A continues to represent the background part, such as 1513, which should be in clear state.

MSAA Rendering

Figure 16A:
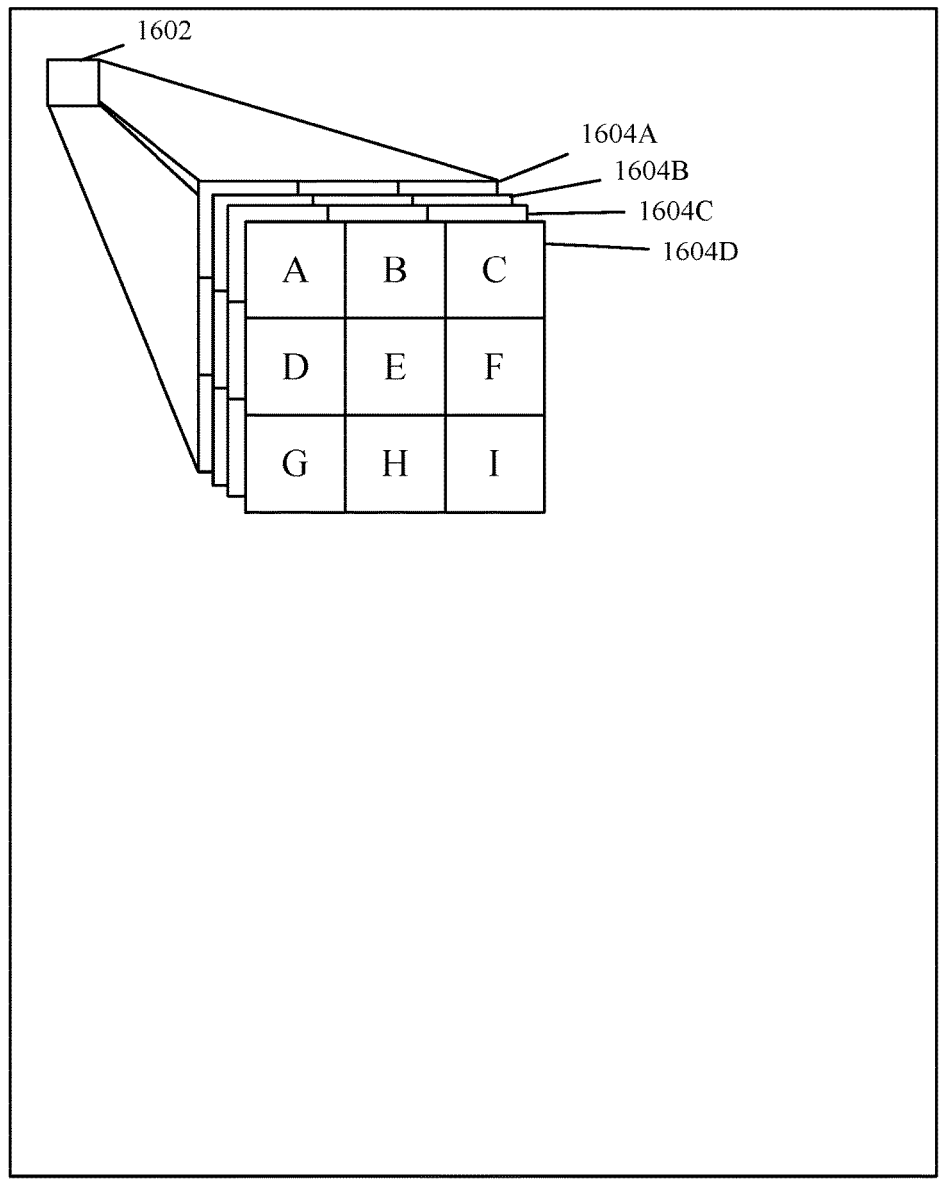
FIGS. 16A-16B illustrates multisample anti-aliasing within a graphics processing system according to embodiments described herein.
Figure 16B:
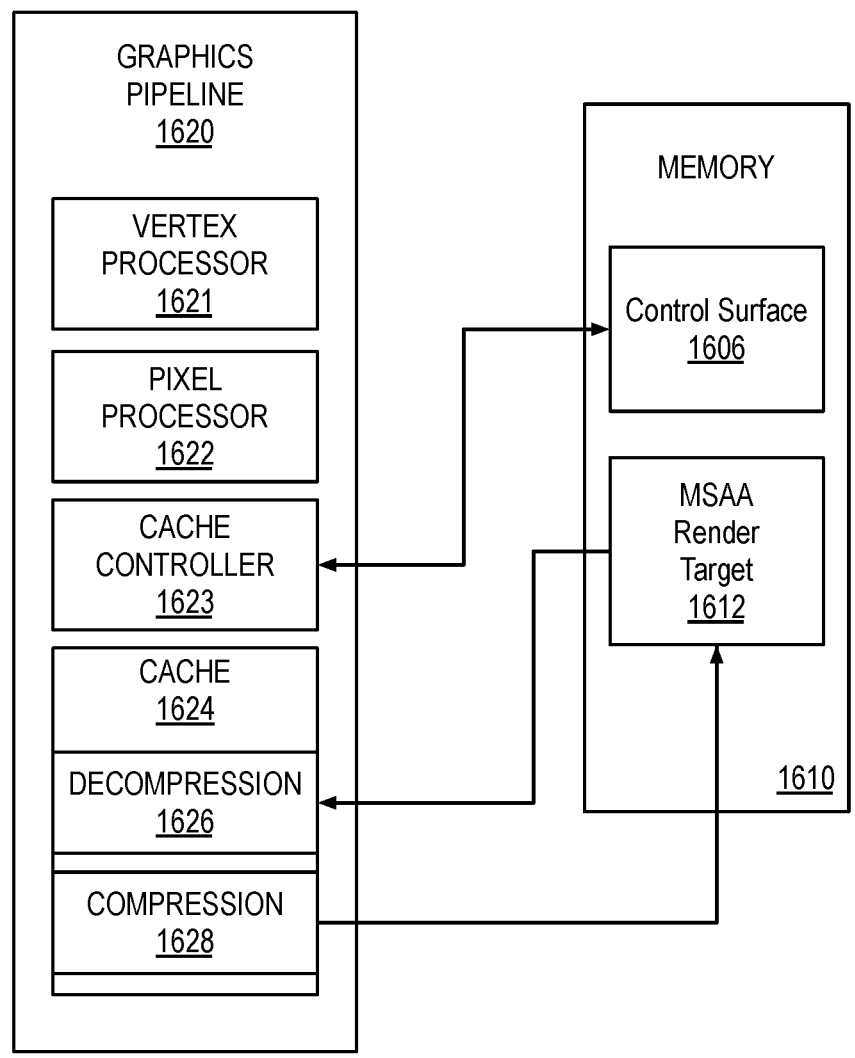

FIGS. 16A-16B illustrates multisample anti-aliasing within a graphics processing system according to embodiments described herein. FIG. 16A illustrates an exemplary memory layout for a multisample render target. FIG. 16B is a block diagram of a graphics processing system having support for multisample render targets.

The pixel output from the rendering of geometric primitives may result in distortion artifacts known as aliasing. Aliasing can result whenever a high-resolution image is represented at a lower resolution. Anti-aliasing removes signal components that have a higher frequency than can properly be resolved via the rendered samples. In the specific case of triangle rasterization, aliasing can result is jagged edges in rendered images. Anti-aliasing improves the appearance of rendered edges by smoothing the rendered results. In the specific case of multisampling anti-aliasing (MSAA) multiple locations are sampled for every pixel. Each sample represents potential output color for the pixels. If a triangle to be rasterized covers multiple sample locations within a pixel, a shading computation is performed for the samples and the results are combined to generate an output color for the pixel. The multiple samples per pixel can be output to a multisample render target.

As shown in FIG. 16A, a multisample render target can store multiple samples output for each pixel. In some existing multisample render target implementations, pixels can be represented in a planar format, in which each set of samples is stored in a separate memory plane. However, implementations are not limited to the use of the illustrated planar format. FIG. 16A illustrates 4xMSAA in which four samples are used per pixel. A 3×3 pixel tile 702 of nine pixels (A-I) is represented.

While a 3×3 pixel tile 1602 of nine pixels is illustrated, the pixel tile 1602 may include any number of pixels. For example and in one embodiment the pixel tile 1602 may be an 8×4 pixel tile including 32 pixels. Each set of samples for the tile can be stored in a separate plane (e.g., planes 1604A-1604D). In one embodiment the number of plane that are allocated is determined by the number of distinct colors associated with the various samples. For example, if the four samples have four different color values, four color plane are used. If a single value is present for all samples, only a single value is stored in a single plane. Before a final image is output, an MSAA resolve operation is performed on the tile in which the color values for each sample of a pixel are combined. If only a single value is stored for a pixel, the resolve operation uses the single value. In one embodiment, if multiple different color values are stored for differing samples for a pixel, the color values may be averaged.

The graphics processing system of FIG. 16B includes a graphics pipeline 1620 having vertex processor 1621, a pixel processor 1622, a cache controller 1623, and a cache 1624. In one embodiment the cache 1624 is a render target cache that includes or is associated with decompression 1626 and compression 1628 logic. The graphics pipeline 1620 can couple to a memory 1610, which can include a higher level of cache memory, local memory, system memory, or other memory in which a surface for use by the graphics processor may be stored. The vertex processor 1621 and pixel processor 1622, in one embodiment, are implemented as shader programs that can be processed by a shader unit within a shader engine as described herein. The shader unit can process the shader programs and execute computational operations for the shader programs using graphics execution logic as described herein.

In one embodiment the graphics pipeline 1620 can allocate space for a multisample render target (e.g., MSAA render target 1612) in memory 1610. The pixel processor 1622 can render the multiple samples for each pixel to the MSAA render target 1612. As the sample data is written, the pixel processor can store the sample data in the cache 1624. The sample data can be compressed via compression 1628 logic before the samples are stored to the MSAA render target 1612 in memory. When the MSAA render target 1612 is read from memory, the data can be decompressed via decompression 1626 logic.

The compression 1628 logic can attempt lossless compression on the data for the MSAA render target 1612 via a lossless color compression algorithm, such as a delta color compression algorithm or another lossless compression algorithm suitable for compressing color data. Additionally, the compression 1628 logic can perform multisample compression to remove duplicate color values from the set of samples, such that, for example, only distinct sample color values are stored for each pixel. The multisample compression and the lossless compression can be performed as distinct operations. For example, multisample compression to remove duplicate samples can be performed before lossless compression of the color data to be stored in the MSAA render target 1612. In one embodiment the pixel processor 1622 can be configured with multisample compression logic such that only unique sample color values are output for a pixel.

In one embodiment, a control surface 1606 for the MSAA render target 1612 is stored in memory to indicate the compression status for one or more portions (e.g., tiles) of the MSAA render target 1612. In one embodiment if the compression 1628 logic can compress a data tile of the MSAA render target 1612 without loss of data, the data tile is stored in memory in a compressed format and the control surface 1606 for the tile is updated to indicate that the tile is compressed. Additionally, the control surface 1606 can also be used to map stored color data to multiple samples of a pixel. If the compression 1628 logic is not able to compress a data tile of the MSAA render target 1612 without loss, then uncompressed data of the tile is stored in memory 1610 and one or more metadata flags or bits can be set to indicate that the data is uncompressed. Thus, the MSAA render target 1612 can have some data tiles that are compressed and some that are uncompressed.

Optimized Resolve for an MSAA Render Target

Implementations of MSAA resolve known in the art do not utilize the cleared status of the source texture. As a result, every sample is read from the MSAA source texture and a normal write occurs for the destination non-MSAA texture. As a result, the full compression benefits of fast clear when reading/writing the destination texture may not be realized. In the case of a cleared pixel, the optimized MSAA resolve logic described herein is only required to read the control surface of the source surface. For a typical 4xMSAA 64-bits per pixel surface, a reduction from 33 bytes per pixel to 1 byte per pixel can be realized, with a 9 to 1 reduction realized in the event only a single color is stored for the multiple samples. Additionally, only the control surface of the destination surface needs to be updated. The reduction in memory bandwidth is higher than known color compression solutions, translating into significant performance improvements. Moreover, additional bandwidth savings can be realized if the non-MSAA surface is subsequently read as a texture, as the sampler hardware is only required to read the control surface and the clear color.

Figure 17:
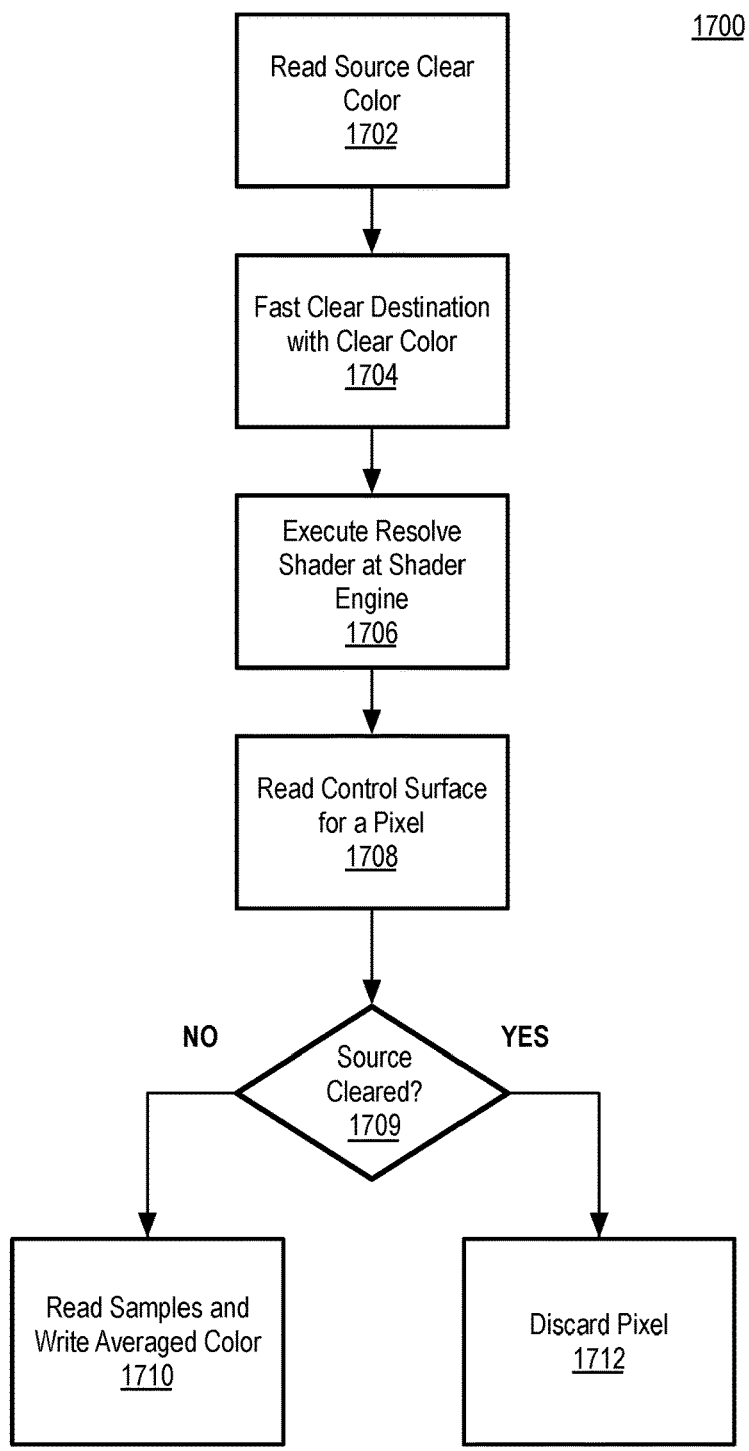
FIG. 17 illustrates a process to leverage control surface fast clears for 3D operations, according to one embodiment.

FIG. 17 illustrates a process 1700 to leverage control surface fast clears for 3D operations, according to one embodiment. The process 1700 can be used to enable an optimized MSAA resolve by leveraging graphics processor hardware support for fast clears. In one embodiment, graphics control software, such as a graphics driver, can configure a graphics processing unit to perform the process 1700 in two passes. Thus, a portion of the process 1700 can be performed by a general-purpose or application processor and a portion of the process 1700 can be performed by execution units within a graphics processor as described herein.

In the first pass, a multisample fast clear can be performed on the destination texture using the clear color of the source surface. The multisample fast clear, in one embodiment, includes reading the source clear color value, as shown at block 1702, and clearing the destination control surface to indicate that all pixels are cleared, as shown at block 1704. In various embodiments, the clear color for the source surface can be read from a register (e.g., a clear color register) or a location in memory. In some implementations, the clear color can be read from metadata associated with the source surface, such as multisample metadata and/or compression metadata. The process 1700 may store the source clear color as intermediate data and provide the source clear color as an input to the fast-clear operation performed on the destination surface at block 1704.

In the second pass, a full render target draw can be performed on the destination. During the draw, an MSAA resolve shader is executed at a shader engine, as shown at block 1706. For each pixel, the resolve shader can read the control surface, as shown at block 1708, and checks if the corresponding source pixel is cleared at block 1709. If the control surface indicates that the pixel is cleared, then the pixel is discarded at block 1712, avoiding the memory bandwidth consumption associated with reading any of the samples and/or writing the destination color. If a pixel is not cleared, then a normal resolve is performed, in which the samples are read and the average color is written to the destination, as shown at block 1710. In one embodiment the reading of the control surface does not introduce additional overhead, as the control surface must be read in order to load the correct samples.

Figure 18:
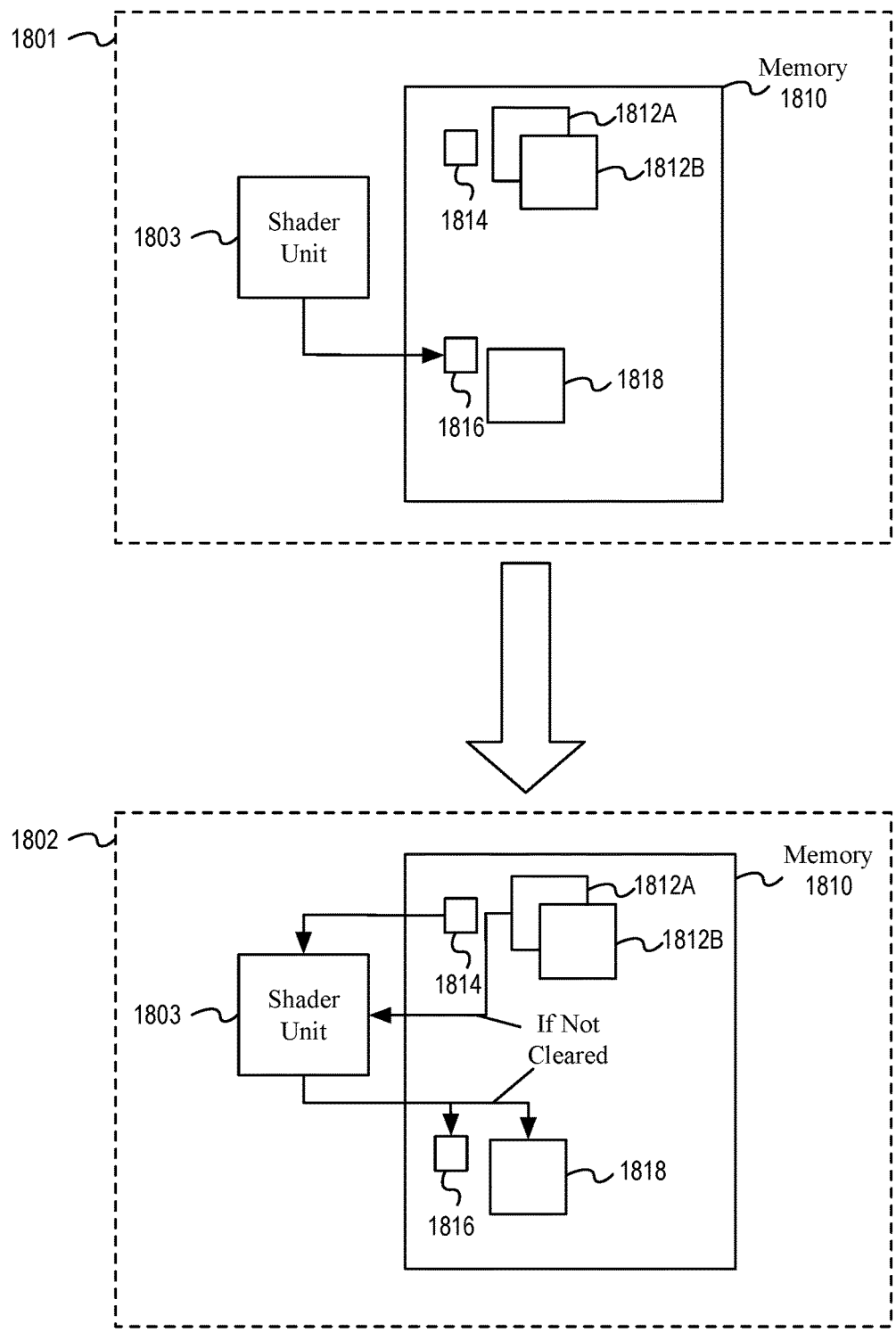
FIG. 18 illustrates memory accesses performed to when performing MSAA resolves using fast clears, according to an embodiment.

FIG. 18 illustrates memory accesses performed to when performing MSAA resolves using fast clears, according to an embodiment. Memory 1810 accessible to a shader unit 1803 can store multisample data for a source surface 1812 having multiple planes (e.g. plane 1812A, plane 1812B), a source control surface 1814, a destination control surface 1816, and a destination surface 1818. The multisample render target may be an MSAA render target 1612 as in FIG. 16B. The source control surface 1816 may be similar to the control surface 1606 as in FIG. 16B. The memory 1810 can be memory that is local to the shader unit and can be stored in various caches, on-die memory, or on-board memory of a graphics processor. The memory 1810 can also be system memory that is mapped into an address space accessible by the shader unit 1803. The shader unit 1803 can be a shader processor as described herein, such as a pixel shader or fragment shader. At least some operations illustrated as performed by the shader unit 1803 can also be performed by a general-purpose graphics processor execution unit under the direction of shader processing logic.

The destination control surface 1818 may be similar to the control surface 1606 of FIG. 16B, although the metadata stored in a control surfaces can vary depending on the type of surface with which the metadata is associated. For example, multisample render targets can contain metadata with respect to multisample color compression, as well as fast clear metadata and/or lossless compression metadata, while non-multisample render targets may lack the metadata for multisample color compression. Furthermore, the specific format and layout in which the metadata is stored within a given control surface can vary across embodiments.

The memory accesses are illustrative of the two operational phases of process 1700 of FIG. 17. During the first phase 1801, the shader unit 1803 can perform a fast clear of the destination surface 1818 by writing clear metadata to the destination control surface 1816. During the second phase, the shader unit 1803 reads the source control surface 1814. If the source control surface 1814 indicates that a pixel of the source surface is cleared, then execution ends and the pixel is discarded. If the pixel of the source surface is not cleared, the shader unit 1803 reads the source samples for the pixel from the source surface 1812, resolves (e.g., averages) the color values, writes the resolved color value to the destination surface 1818, and updates the destination control surface 1816 to indicate that the written pixel is has data (e.g., is not clear). Where MSAA compression is enabled, the number of planes or regions of the source surface depends on the number of differently colored samples are associated with a pixel. Where two planes or regions are read (e.g., plane 1812A, plane 1812B), two different colors are stored for the pixel. If the multiple samples contain a single color, then a single plane (e.g., 1812A) may be read and written to the destination surface 1818.

Figure 19A:
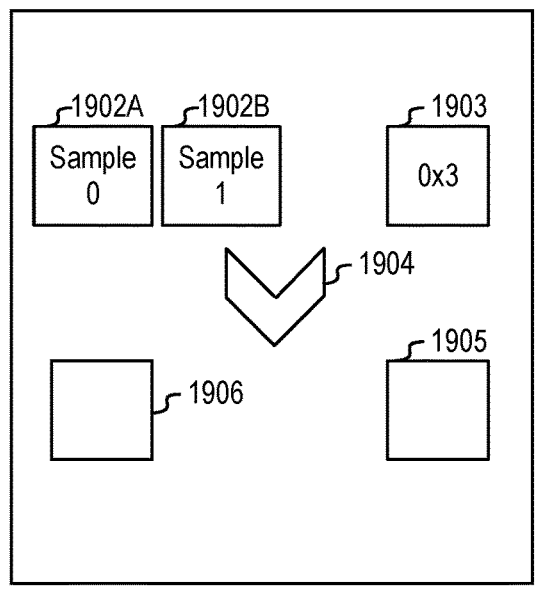
FIGS. 19A-19B compare memory accesses between optimized and un-optimized MSAA resolves, according to embodiments described herein.
Figure 19B:
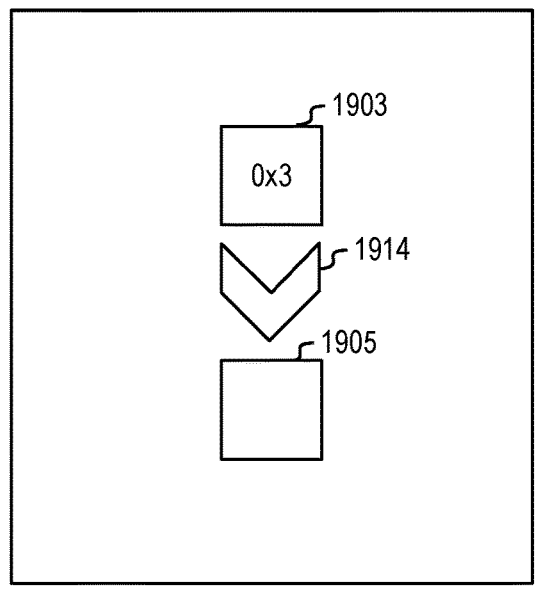

FIGS. 19A-19B compare memory accesses between optimized and un-optimized MSAA resolves, according to embodiments described herein. FIG. 19A illustrates an un-optimized MSAA resolve for two, differently colored samples. If the optimization described herein is disabled, the resolve shader 1904 may trigger memory accesses to read the color data for multiple samples 1901A-1902B of a pixel within a multisample render target, as well as the source control surface 1903. The resolve shader 1904 may trigger further memory accesses by writing the resolved color value to the destination surface 1906 and updating the destination control surface 1905 to indicate that the pixel contains color data. FIG. 19A illustrates an optimized resolve, in which an optimized resolve shader 1914 can resolve a pixel by performing a read from the source control surface 1903 and a write to the destination control surface 1905. When the source control surface 1903 indicates that the pixel is clear, no pixel data is read from the source surface. A portion of an intermediate representation for an exemplary optimized resolve shader 1914 is shown in Table 1 below. In the optimized resolve shader of Table 1, the resolve shader will discard a pixel in the event the source control surface indicates that the pixel is clear.

TABLE 1

Intermediate Representation of Optimized Resolve Shader

```
}
...
 %6 = call <2 x i32> @ldmcsptr.v2i32.p196608v4f32(i32 %3, i32
%4, i32 %5, i32 0, <4 x float> addrspace(196608)* null, i32 0, i32 0, i32
0)
 %7 = extractelement <2 x i32> %6, i32 0
 ; Check if lower half = 0x3, which indicates that it is cleared
 %cleared = icmp eq i32 %7, 3
 call void @discard(i1 %cleared)
 %8 = extractelement <2 x i32> %6, i32 1
 %9 = call <4 x float> @ldmsptr.v4f32.p196608v4f32(i32 1, ...)
 %10 = extractelement <4 x float> %9, i32 0
 %11 = extractelement <4 x float> %9, i32 1
 %12 = extractelement <4 x float> %9, i32 2
 %13 = extractelement <4 x float> %9, i32 3
 %14 = call <4 x float> @ldmsptr.v4f32.p196608v4f32(i32 0, ...)
 %15 = extractelement <4 x float> %14, i32 0
 %16 = extractelement <4 x float> %14, i32 1
 %17 = extractelement <4 x float> %14, i32 2
 %18 = extractelement <4 x float> %14, i32 3
 %19 = fmul float %10, 5.000000e−01
 %20 = fmul float %11, 5.000000e−01
 %21 = fmul float %12, 5.000000e−01
 %22 = fmul float %13, 5.000000e−01
 %23 = fmul float %15, 5.000000e−01
 %24 = fadd float %23, %19
 %25 = fmul float %16, 5.000000e−01
 %26 = fadd float %25, %20
 %27 = fmul float %17, 5.000000e−01
 %28 = fadd float %27, %21
 %29 = fmul float %18, 5.000000e−01
 %30 = fadd float %29, %22
 call void @OUTPUT.f32(float %24, float %26, float %28, float %30,
 i32 0, i32 0)
 ret void
}
```

In some embodiments, hardware within the graphics processing unit can be adapted to enable the operations described above to be performed in a single operation. In one embodiment, the graphics processing logic can be configured to use the MSAA control surface for a multi-sample render target in a manner similar to a stencil buffer, wherein the contents of the control surface at a particular location are used to decide whether to apply a discard operation, or calculate the resolved value, in one embodiment. In such configuration, only non-cleared pixels will be executed and clear pixels will be automatically killed (e.g., bypassed) during the resolve draw based on the value in the control surface. The non-killed pixels, will then write out the averaged color. In this configuration, execution on the cleared pixels is completely bypassed, which avoids divergence within the resolve shader.

In one embodiment, all pixels are dispatched and the resolve shader can read the MSAA control surface. If a pixel is cleared, the resolve shader can issue a new write command, which writes to destination control surface to mark the pixel as cleared. Otherwise, the resolve shader reads the samples from the source surface and outputs the averaged color. In this configuration, the separate control surface clear is skipped, allowing the draw operation to be performed using a single primitive. Furthermore, for a non-cleared pixel, only one write occurs.

Figure 20:
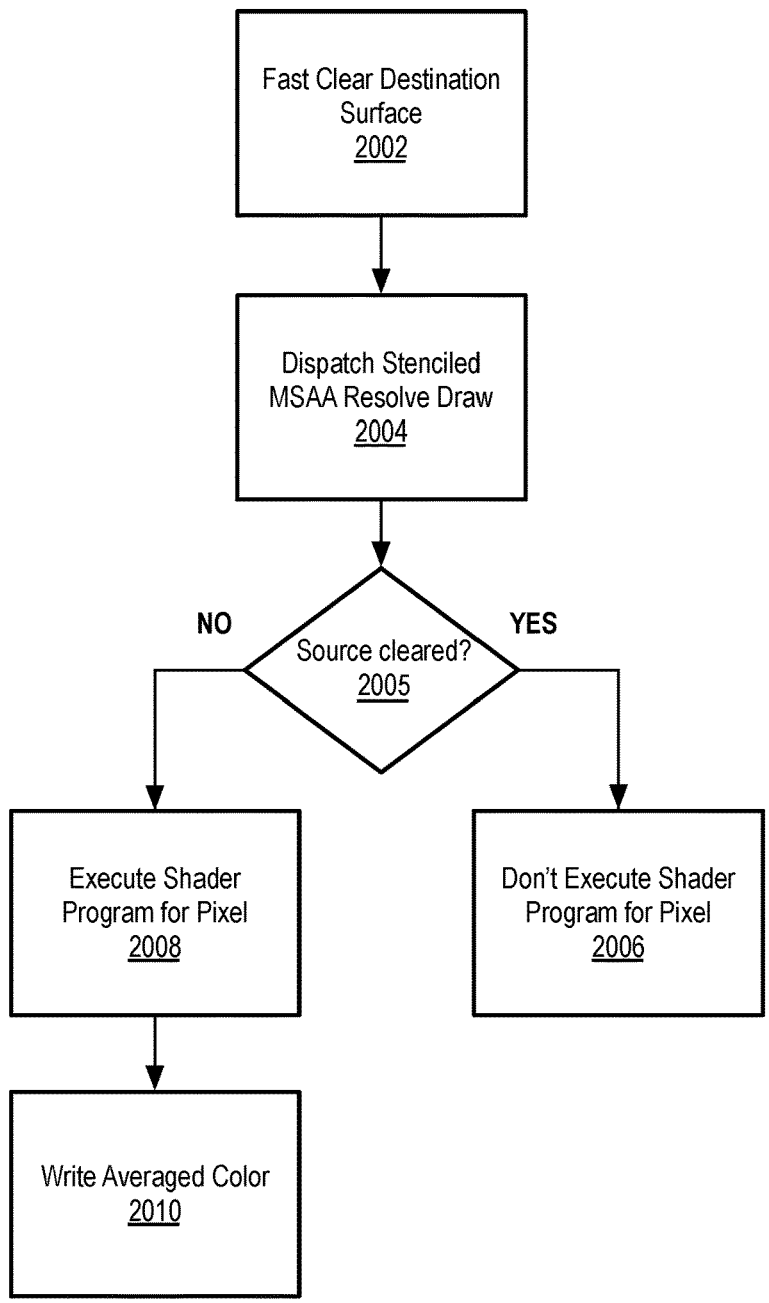
FIG. 20 illustrates a process for performing stenciled MSAA resolve, according to an embodiment.

FIG. 20 illustrates a process 2000 for performing stenciled MSAA resolve, according to an embodiment. As shown at block 2002, the process 2000 includes configuring a graphics processor to perform a fast-clear operation on a destination surface, as shown at block 2002. In one embodiment the fast clear at block 2002 can be performed using the clear color of the source surface, which can involve a read of the source clear color, as in block 1702 of FIG. 17. In one embodiment, the operation or instruction used to perform the fast clear of the destination surface at block 2002 can cause the graphics processor to automatically clear the destination surface using the clear color of an indicated source surface.

As shown at block 2004, the process 2000 additionally includes to dispatch a stenciled MSAA resolve draw. The stenciled MSAA resolve draw operates differently than a standard MSAA resolve in that the multisample metadata for the source surface is used as a stencil to determine if the shader will operate on a given pixel. As shown at block 2005, before the shader program is executed for a given pixel (or fragment), the shader unit can determine whether the multisample metadata indicates that the source data contains the clear color. If the source data is clear at block 2005, the shader unit will not execute (e.g., bypass) the shader program for that pixel, as shown at block 2006. If the source data is not clear, as determined at block 2005, the shader unit can execute the shader program at block 2008. As shown at block 2010, the shader program can write an averaged color value that is an average of the color values of the various sample positions associated with a pixel. The illustrated process 2000 can be performed within a graphics processor having logic to support a stenciled multisample resolve operation.

Figure 21:
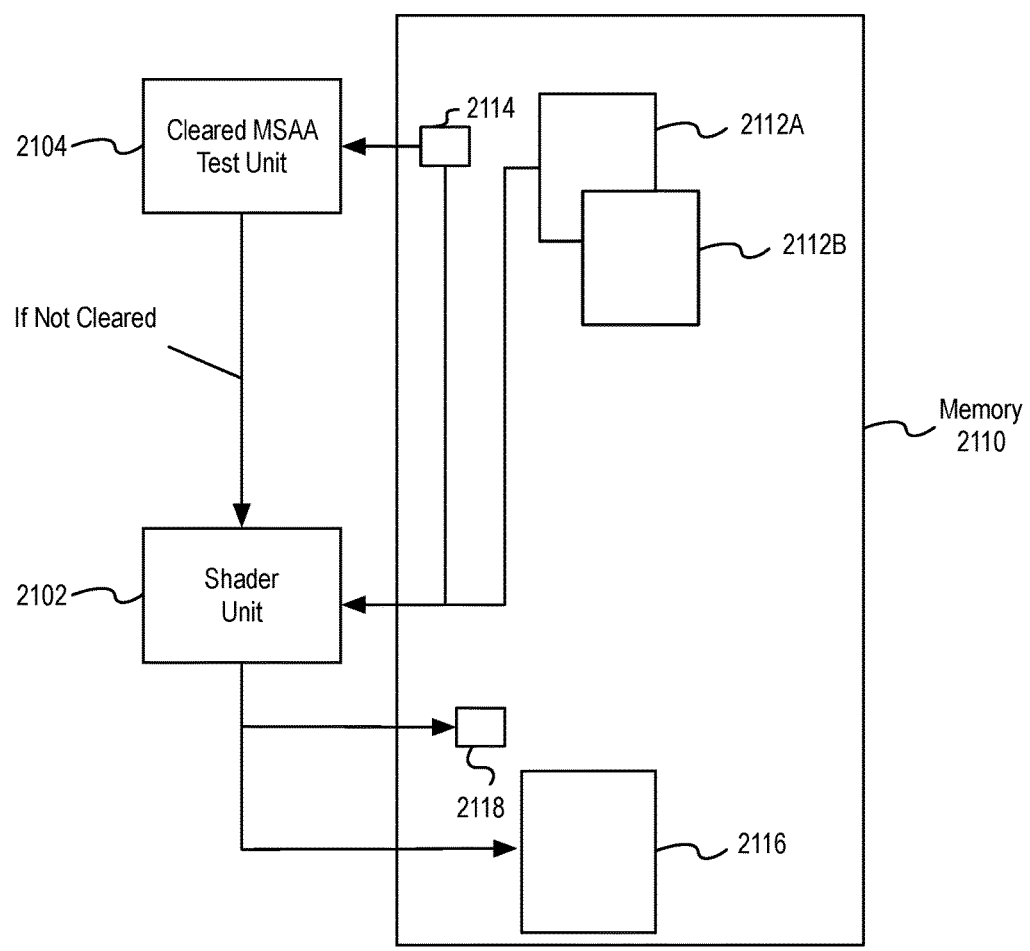
FIG. 21 illustrates exemplary graphics processing logic for a stenciled multisample resolve, according to an embodiment.

FIG. 21 illustrates exemplary graphics processing logic for a stenciled multisample resolve, according to an embodiment. The graphics processor components can be similar to the components illustrated in FIG. 18. Memory 2110 accessible to a shader unit 2102 can include a multisample data 2112 containing color data for multiple planes 2112A-2112B, or other memory regions containing multisample color data. A source control surface 2114 contains metadata that indicates whether a given pixel is clear or, in one embodiment, whether multiple samples for the pixel can be mapped to a single color. The memory 2110 also contains a destination surface 2116 and an associated destination control surface 2118. In one embodiment, a first operational phase can be performed in which a fast-clear is performed on the destination surface 2116 by writing to the metadata in the destination control surface 2118 to set the pixels of the destination surface 2216 to cleared.

Additionally, the shader unit 2102 can be coupled with a cleared MSAA test unit 2104, which can test metadata within the source control plane 2114 for a given pixel to determine if the pixel contains the cleared value. The cleared MSAA test unit 2104 can gate invocation of the shader program within the shader unit 2102, such that if the source control plane indicates cleared source data, shader invocation for the pixel is entirely bypassed. Where multiple pixels are processed in parallel, bypassing invocation of the shader program prevents the various shader threads from diverging in the case of a clear pixel, as only shader threads that will write to the destination surface are processed by the shader unit 2102.

Figure 22:
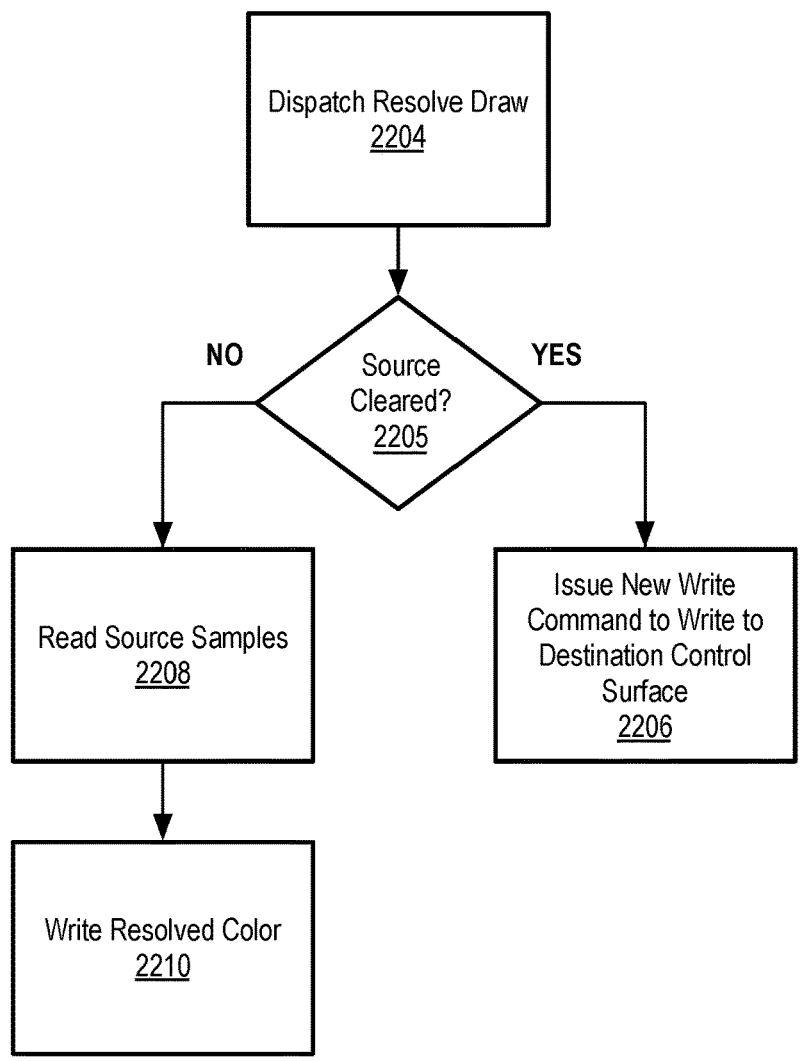
FIG. 22 illustrates an additional process for leveraging control surface fast clears to optimize 3D operations, according to an embodiment.

FIG. 22 illustrates an additional process 2200 for leveraging control surface fast clears to optimize 3D operations, according to an embodiment. In one embodiment, the process 2200 can enable by a shader unit to perform a single-pass optimized MSAA resolve. The process 2200 of FIG. 22 differs from the process 1700 of FIG. 17 and the process 2000 of FIG. 20 in that the initial fast clear of the destination surface is bypassed, enabling the resolve to be performed in a single pass. In one embodiment a resolve draw is dispatched to a shader unit, as shown at block 2204. The resolve draw includes logic to determine, at block 2205 whether a given source pixel is cleared. If the source is cleared, the resolve shader can issue a new write command on the shader unit to write to the destination control surface, as shown at block 2206. The new write command issued at block 2206 can write to the metadata in the destination control surface to set the pixel to clear. In one embodiment the new write command issued at block 2206 can be performed independently of the shader program issuing the write command. If the source is not cleared and contains one or more color data values associated with one or more samples of the pixel, the shader can read the color data values for the source samples at block 2208. The shader unit can then write a resolved color value to the destination at block 2210. The resolved color value, in one embodiment, is an average color value of the colors of the source samples read at block 2208.

Figure 23:
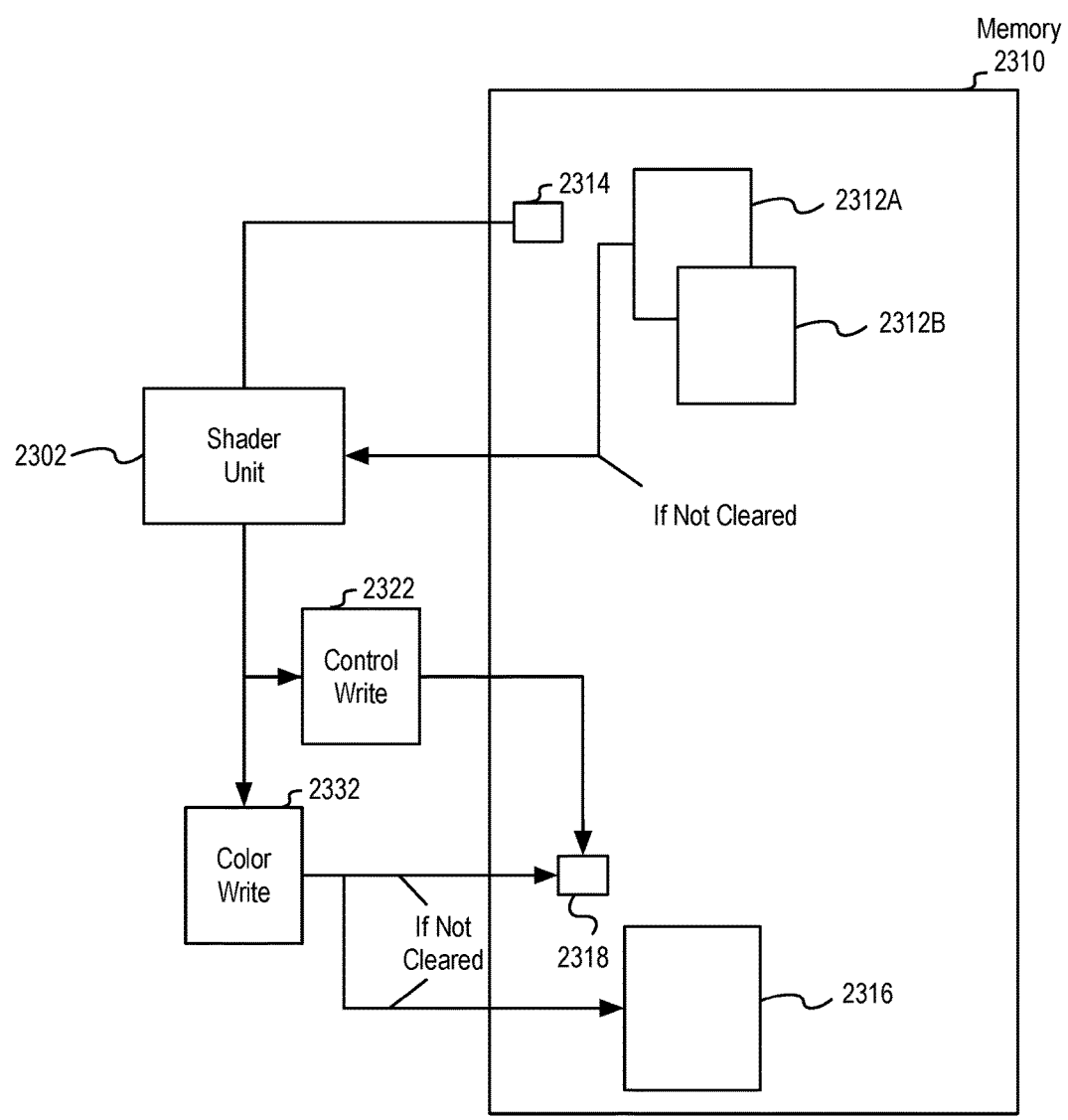
FIG. 23 illustrates additional hardware logic for leveraging control surface fast clears to optimize 3D operations, according to an embodiment.

FIG. 23 illustrates additional hardware logic for leveraging control surface fast clears to optimize 3D operations, according to an embodiment. The hardware logic of FIG. 23 can be used to implement the process 2200 of FIG. 22, and can include aspects that are similar to the graphics processor components illustrated in FIG. 18 and FIG. 21. The hardware logic of FIG. 23 includes memory 2310 that stores a multisample source surface 2312 having data associated with multiple samples 2312A-2312B. The source surface 2312 can have an associated source control surface 2314 to store metadata for the source surface 2312, including metadata that indicates whether a pixel within the source surface is cleared. The memory 2310 can also store a destination surface 2316 and an associated destination control surface 2318 that stores metadata for the pixels of the destination surface. A shader unit 2302 is also illustrated, which can execute or direct execution of a shader program. The shader unit 2302 can include features of any of the shader units or shader execution units described herein. The shader unit 2302 can be configured to execute a pixel shader or fragment shader program, and in one embodiment can execute general-purpose compute operations via a compute shader.

In one embodiment, the shader unit, when executing the resolve shader dispatched from the resolve draw at block 2204 of FIG. 22, can read the source control surface 2314 to determine if a given pixel is cleared. If the pixel is cleared, then the shader unit 2302 can issue a control write 2322 to clear the metadata for the pixel within the destination control surface 2318. If the source pixel is not cleared, then the source surface 2312 is read. The shader unit then computes a resolved color result, which can be an average color value of the multiple color values for the different samples, using a color write operation 2332, update the destination surface 2316 and destination control surface 2318.

While the above description and examples make specific reference to MSAA resolve operations, the embodiments described herein are not limited to MSAA resolves. Similar software, shader, and hardware logic can be applied optimize surface copies, texture initialization, mipmap generation, and other 3D operations in which the source surface includes pixels having a cleared value. More generally, embodiments described herein have been described with respect to specific cases of a broader class of optimizations for any operation that accepts a surface as input and outputs some logical transformation of the input. As exemplified above, some subset of the logical operations, reading of the input, and even writing the output can be eliminated under certain conditions.

The optimization of the embodiments described herein can generate statistically significant results when render operations are analyzed using micro-benchmarking techniques. In some embodiments, the maximum compression for MSAA and non-MSAA surfaces can be determined to be significantly improved when performing MSAA resolve operations when all or part of the MSAA texture has been cleared, allowing consumed memory bandwidth to fall below the maximum possible lossless compression ratio available without such optimizations.

Figure 24:
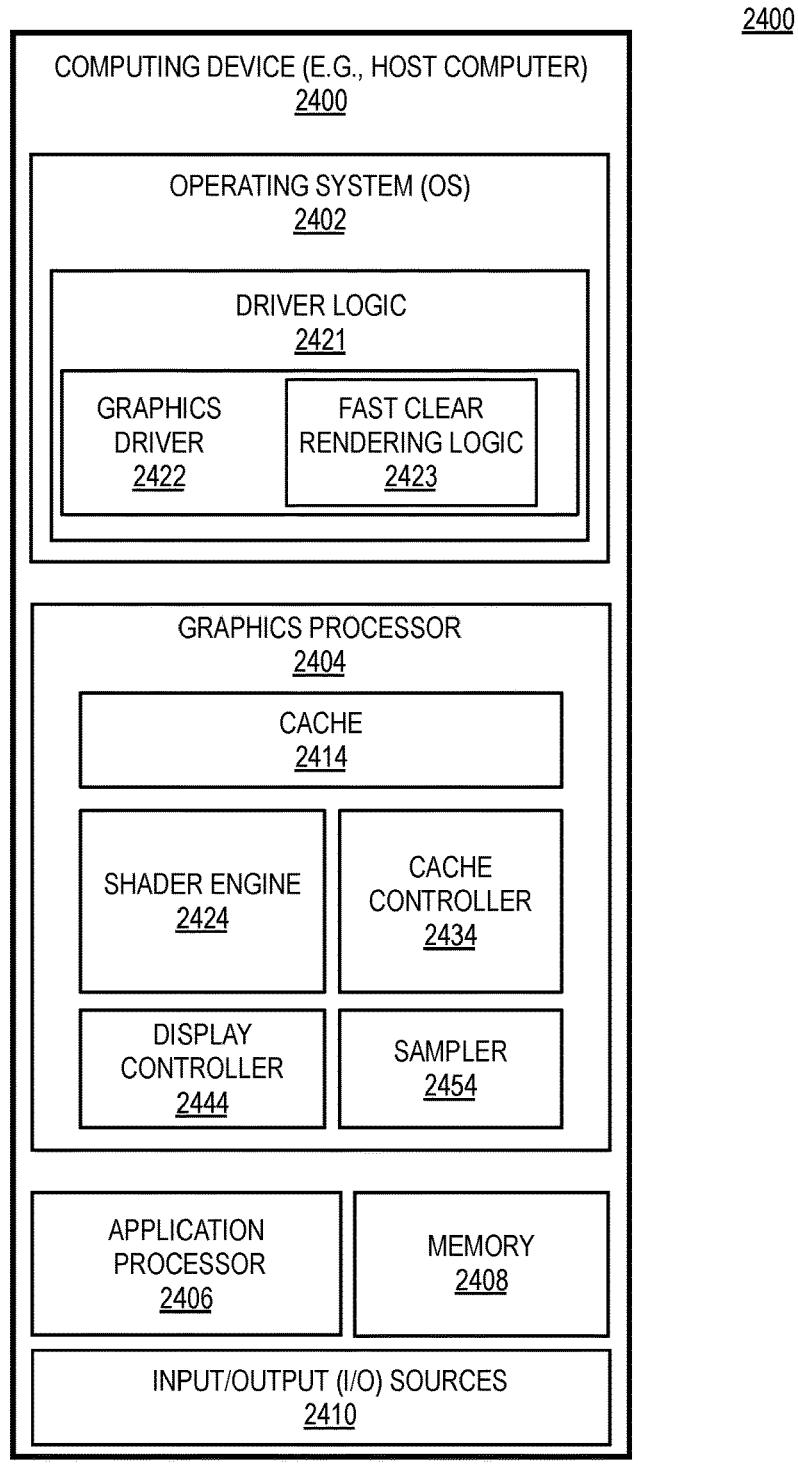
FIG. 24 is a block diagram of a computing device configured to perform optimized clear color rendering, according to an embodiment.

FIG. 24 is a block diagram of a computing device 2400 configured to perform optimized clear color rendering, according to an embodiment. Computing device 2400 (e.g., mobile computing device, desktop computer, etc.) may be the same or similar to the data processing system 100 of FIG. 1, or any other computing device or data processing system described herein.

Computing device 2400 may include a mobile computing device (e.g., smartphone, tablet computer, laptops, game consoles, portable workstations, etc.) serving as a host machine for a graphics processor 2404. The graphics processor 2404 may be a graphics rendering focused graphics processor, but can also include general-purpose compute units configured to perform general-purpose compute operations via the shader engine 2424. The computing device 2400 may include any number and type of communication devices, such as large computing systems, such as server computers, desktop computers, etc., and may further include set-top boxes (e.g., Internet-based cable television set-top boxes, etc.), global positioning system (GPS)-based devices, etc. The computing device 2400 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2400 includes a mobile computing device employing an integrated circuit ("IC"), such as system on a chip ("SoC" or "SOC"), integrating various hardware and/or software components of computing device 2400 on a single chip.

In one embodiment, the graphics processor 2404 includes a cache 2414, which can be a framebuffer data cache, a rendering cache, or any other cache described herein. In one embodiment the cache 2414 can include multiple internal level of cache memory. The cache 2414 can be controlled by a cache controller 2434, which can store or address metadata for cache lines of the cache 2414. For example, the cache controller 2434 can store metadata that indicates that a cache line is associated with clear data, or that all entries in a cache line are the same color. In one embodiment, the graphics processor 2404 includes a display controller 2444 and a sampler 2454, each configured to sample from and display a framebuffer, texture, or another graphics surface that contains clear data. In one embodiment, the display controller 2444 is a variant of the display controller 302 of FIG. 3 and/or the display engine 840 of FIG. 4. The sampler 2454, in various embodiments, can be variants of the samplers of FIG. 5 or FIG. 8.

As illustrated, in one embodiment the computing device 2400 may further include any number and type of hardware components and/or software components, such as (but not limited to) an application processor 2406, memory 2408, and input/output (I/O) sources 2410. The application processor 2406 can interact with a hardware graphics pipeline as described herein to enable heterogeneous graphics processing. Processed data can be stored in a buffer in the hardware graphics pipeline, and state information can be stored in memory 2408. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

The application processor 2406 can include one or processors, such as processor(s) 102 of FIG. 1, and may be the central processing unit (CPU) that is used at least in part to execute an operating system (OS) 2402 for the computing device 2400. The OS 2402 can serve as an interface between hardware and/or physical resources of the computer device 2400 and a user. The OS 2402 can include driver logic 2421 including a graphics driver 2422. The graphics driver 2422 can include user mode graphics driver 1026 and/or kernel mode graphics driver 1029 of FIG. 10. The graphics driver 2422 can include fast clear rendering logic 2423 to configure operations utilizing the optimized clear color rendering via the shader engine 2424 of the graphics processor 2404. In various embodiments, the shader engine 2424 can include logic similar to a fragment processor 1315A-1315N or shader core 1355A-1355N as in FIG. 13A-13B, or any other shader processor described herein, such as the shader processors 507A-507F of FIG. 5. The shader engine 2424 can include or be associated with graphics execution resources as described herein, such as, for example, the execution logic 600 of FIG. 6A-6B.

It is contemplated that in some embodiments, the graphics processor 2404 may exist as part of the application processor 2406 (such as part of a physical CPU package) in which case, at least a portion of the memory 2408 may be shared by the application processor 2406 and graphics processor 2404, although at least a portion of the memory 2408 may be exclusive to the graphics processor 2404, or the graphics processor 2404 may have a separate store of memory.

The memory 2408 may comprise a pre-allocated region of a buffer (e.g., framebuffer); however, it should be understood by one of ordinary skill in the art that the embodiments are not so limited, and that any memory accessible to the lower graphics pipeline may be used. The memory 2408 may include various forms of random access memory (RAM) (e.g., SDRAM, SRAM, etc.) comprising an application that makes use of the graphics processor 2404 to render a desktop or 3D graphics scene. A memory controller hub, such as memory controller hub 116 of FIG. 1, may access data in the RAM and forward it to graphics processor 2404 for graphics pipeline processing. The memory 2408 may be made available to other components within the computing device 2400. For example, any data (e.g., input graphics data) received from various I/O sources 2410 of the computing device 2400 can be temporarily queued into memory 2408 prior to their being operated upon by one or more processor(s) (e.g., application processor 2406) in the implementation of a software program or application. Similarly, data that a software program determines should be sent from the computing device 2400 to an outside entity through one of the computing system interfaces, or stored into an internal storage element, is often temporarily queued in memory 2408 prior to its being transmitted or stored. In one embodiment, the memory 2408 can also be used to store control surfaces as described herein.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2410 may include one or more I/O devices that are implemented for transferring data to and/or from the computing device 2400 (e.g., a networking adapter); or, for a large-scale non-volatile storage within the computing device 2400 (e.g., hard disk drive). User input devices, including alphanumeric and other keys, may be used to communicate information and command selections to graphics processor 2404. Another type of user input device is cursor control, such as a mouse, a trackball, a touchscreen, a touchpad, or cursor direction keys to communicate direction information and command selections to graphics processor 2404 and to control cursor movement on the display device. Camera and microphone arrays of the computer device 2400 may be employed to observe gestures, record audio and video and to receive and transmit visual and audio commands.

I/O sources 2410 configured as network interfaces can provide access to a network, such as a LAN, a wide area network (WAN), a metropolitan area network (MAN), a personal area network (PAN), Bluetooth, a cloud network, a cellular or mobile network (e.g., 3rd Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2400 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides a graphics processor comprising a hardware graphics rendering pipeline configured to perform multisample anti-aliasing, the hardware graphics rendering pipeline including pixel processing logic to determine that each sample location of a pixel of a multisample surface is associated with a clear value and resolve a color value for the pixel to a non-multisample surface via a write of metadata to indicate that the pixel has the clear value.

One embodiment provides for a method of resolving color data from a multisample render target, the method comprising dispatching a multisample resolve call to a shader unit, the shader unit to execute a pixel shader program to generate a resolved color value from multiple sample locations of a multisample surface; determining, via the shader unit, that a first pixel of the multisample render target contains is a cleared pixel; and writing, via the shader unit, metadata to indicate that the resolved color value for the first pixel is the color value of a cleared pixel.

One embodiment provides for a data processing system comprising a non-transitory machine-readable medium to store instructions for execution by one or more processors of the data processing system; a memory module to store a multisample render target; and a graphics processing unit including a hardware graphics rendering pipeline configured to perform multisample anti-aliasing, wherein the hardware graphics rendering pipeline includes pixel processing logic execute a pixel shader program cause the pixel processing logic to determine that each sample location of a pixel of a multisample surface is associated with a clear value and resolve a color value for the pixel to a non-multisample surface via a write of metadata to indicate that the pixel has the clear value. In one embodiment, the data processing system includes a register file to store graphics registers. The graphics registers can store a clear color value associated with the multisample surface and the non-multisample surface. The pixel processing logic can read the clear color value for the multisample surface from a register in the register file. Alternatively, the pixel processing logic can read the clear color value from a location in memory. The clear color value can also be stored within a control surface or other metadata for a surface. In one embodiment, the pixel processing logic is configured to read a clear color value associated with the multisample surface, the clear color value to indicate a color associated with the clear value; perform a fast clear on the non-multisample surface, the fast clear to set metadata associated with the non-multisample surface to indicate that each pixel of the non-multisample surface is set to the clear color; determine that one or more sample locations of the pixel of the multisample surface contains a non-clear value; and write a resolved color value for the one or more sample locations of the pixel of the multisample surface to the non-multisample surface.

One embodiment provides for a non-transitory machine-readable medium storing instructions to cause a processing system to perform operations comprising reading a clear color associated with a source surface, wherein the source surface is a multisample surface; performing a fast clear on a destination surface, wherein the destination surface is a non-multisample surface and the fast clear is to set metadata associated with the destination surface to indicate that each pixel of the non-multisample surface is set to the clear color; executing a resolve shader on a shader engine of the processing system, the resolve shader to determine a resolved color value for pixels of the source surface; determining whether first pixel of the source surface is cleared; and discarding the first pixel in response to determining that the first pixel of the source surface is cleared. In one embodiment the operations additionally include determining that first pixel of the source surface is cleared by reading a source control surface associated with the source surface; and setting metadata associated with the destination surface in a destination control surface associated with the destination surface. In one embodiment, performing the fast clear on the destination surface includes setting the clear color associated with the destination surface to the clear color associated with the source surface.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A graphics processor comprising:
a hardware graphics rendering pipeline configured to perform multisample anti-aliasing, the hardware graphics rendering pipeline including pixel processing logic to:
determine that each sample location of a pixel of a multisample surface is associated with a clear value; and
resolve a color value for the pixel to a non-multisample surface via a write of metadata to indicate that the pixel has the clear value, wherein the pixel processing logic is to read a clear color value associated with the clear value in the multisample surface from a location in memory associated with the graphics processor and the memory is additionally to store the multisample surface, the non-multisample surface, and a destination control surface associated with the non-multisample surface, the destination control surface to store the metadata to indicate that the pixel has the clear value.

2. The graphics processor as in claim 1, the pixel processing logic to determine that each sample location of the pixel is associated with the clear value via a read of a source control surface associated with the multisample surface, the source control surface to store metadata for the multisample surface.

3. The graphics processor as in claim 2, the metadata for the multisample surface to indicate whether pixel data of the multisample surface contains a clear value or a color value.

4. The graphics processor as in claim 3, the metadata for the multisample surface to indicate whether the color value is a compressed color value.

5. The graphics processor as in claim 4, the metadata for the multisample surface to indicate a clear color value for the clear value and the pixel processing logic is to read the clear color value from the metadata in the source control surface.

6. The graphics processor as in claim 1, additionally comprising a decompressor to decompress pixel data read from the multisample render target based on a compression status within a control surface associated with the multisample render target.

7. The graphics processor as in claim 1, additionally including a register file to store graphics registers, the graphics registers to store a clear color value associated with the multisample surface and the non-multisample surface, the pixel processing logic to read the clear color value for the multisample surface from a register in the register file.

8. The graphics processor as in claim 1, the pixel processing logic to:
read a clear color value associated with the multisample surface, the clear color value to indicate a color associated with the clear value;
perform a fast clear on the non-multisample surface, the fast clear to set metadata associated with the non-multisample surface to indicate that each pixel of the non-multisample surface is set to the clear color;
determine that one or more sample locations of the pixel of the multisample surface contains a non-clear value; and
write a resolved color value for the one or more sample locations of the pixel of the multisample surface to the non-multisample surface, wherein the resolved color value is an average color value of the one or more sample locations of the pixel of the multisample surface.

9. A method of resolving color data from a multisample render target, the method comprising:
dispatching a multisample resolve call to a shader unit, the shader unit to execute a pixel shader program to generate a first resolved color value from multiple sample locations of a multisample surface;
determining, via the shader unit, that a first pixel of the multisample render target contains a cleared pixel;
writing, via the shader unit, metadata to indicate that the first resolved color value for the first pixel is the color value of a cleared pixel;
determining, via the shader unit, that a second pixel of the multisample render target contains a non-cleared pixel;
generating a second resolved color value from multiple sample locations of the second pixel; and
issuing a write command from the pixel shader program to write the second resolved color value to a non-multisample surface and write metadata to indicate that the non-multisample surface contains a color value.

10. The method as in claim 9, additionally comprising:
issuing a write command from the pixel shader program to write the metadata to indicate that the resolved color value for the first pixel is the color value of a cleared pixel.

11. The method as in claim 9, additionally comprising:
decompressing data of the second pixel based on a compression status within a control surface associated with the multisample render target.

12. A data processing system comprising:
a memory device to store a multisample render target, a non-multisample surface, and a destination control surface associated with the non-multisample surface, the destination control surface to store metadata to indicate that a pixel has a clear value; and
a graphics processing unit having a hardware graphics rendering pipeline configured to perform multisample anti-aliasing, the hardware graphics rendering pipeline including a pixel processor to execute a pixel shader program, the pixel shader program to cause the pixel processor to:
determine that each sample location of a pixel of a multisample surface is associated with a clear value; and resolve a color value for the pixel to the non-multisample surface via a write of the metadata to indicate that the pixel has the clear value.

13. The data processing system as in claim 12, the pixel processor to determine that each sample location of the pixel is associated with the clear value via a read of a source control surface associated with the multisample render target, the source control surface to store metadata for the multisample render target.

14. The data processing system as in claim 13, the metadata for the multisample render target to indicate whether pixel data of the multisample render target contains a clear value or a color value.

15. The data processing system as in claim 14, the metadata for the multisample render target to indicate whether the color value is a compressed color value.

16. The data processing system as in claim 15, the metadata for the multisample render target to indicate a clear color value for the clear value and the pixel processor is to read the clear color value from the metadata in the source control surface.

17. The data processing system as in claim 12, the pixel processor to read a clear color value associated with the clear value in the multisample render target from the memory device.

18. The data processing system as in claim 17, additionally comprising a decompressor to decompress pixel data read from the multisample render target based on a compression status within a control surface associated with the multisample render target.

* * * * *